United States Patent
Zamzow

[19]

[11] Patent Number: 6,046,798
[45] Date of Patent: Apr. 4, 2000

[54] METHOD AND APPARATUS FOR ACQUIRING INFORMATION ABOUT AT LEAST ONE OPTICAL FIBER END

[75] Inventor: Bert Zamzow, Munich, Germany

[73] Assignee: Siemens Aktiengesellschaft, Munich, Germany

[21] Appl. No.: 09/136,021

[22] Filed: Aug. 19, 1998

[30] Foreign Application Priority Data

Aug. 27, 1997 [DE] Germany ............................ 197 37 410

[51] Int. Cl.[7] .................................................. G01N 21/00
[52] U.S. Cl. ............................................. 356/73.1; 385/97
[58] Field of Search .................................. 356/73.1, 400; 250/559.3, 227.24, 559.08; 385/55, 97, 139, 84

[56] References Cited

U.S. PATENT DOCUMENTS 4,825,092  4/1989  Mehadji ................................ 250/561
5,011,259  4/1991  Lieber et al. .

FOREIGN PATENT DOCUMENTS 0 400 408  12/1990  European Pat. Off. .

*Primary Examiner*—Frank G. Font
*Assistant Examiner*—Tu T. Nguyen
*Attorney, Agent, or Firm*—Hill & Simpson

[57] ABSTRACT

The edge of an end face of a fiber image is crossed at least once by at least two measurement windows at different locations. The changes in the intensity values registered for each of the measurement windows are obtained and used for interpretation to obtain the error angle of the end face of the fiber relative to a plane extending perpendicular to the fiber axis.

27 Claims, 12 Drawing Sheets

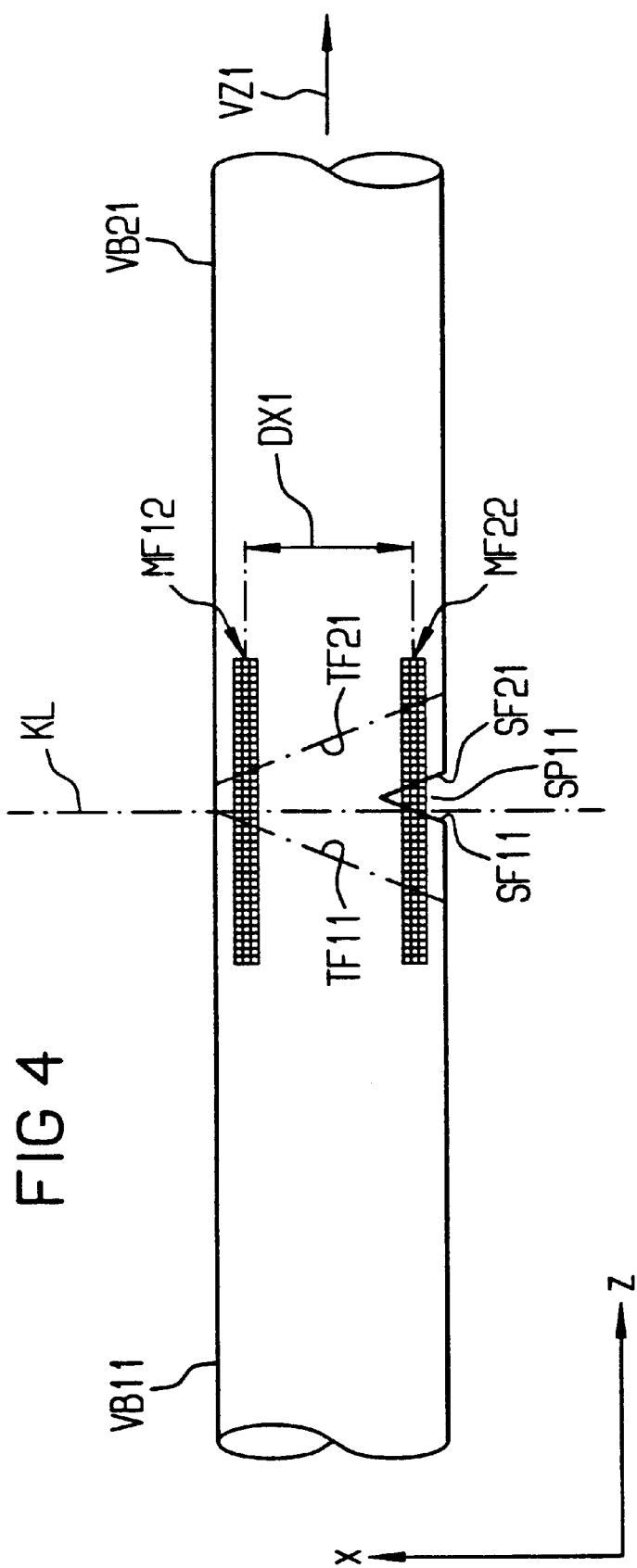

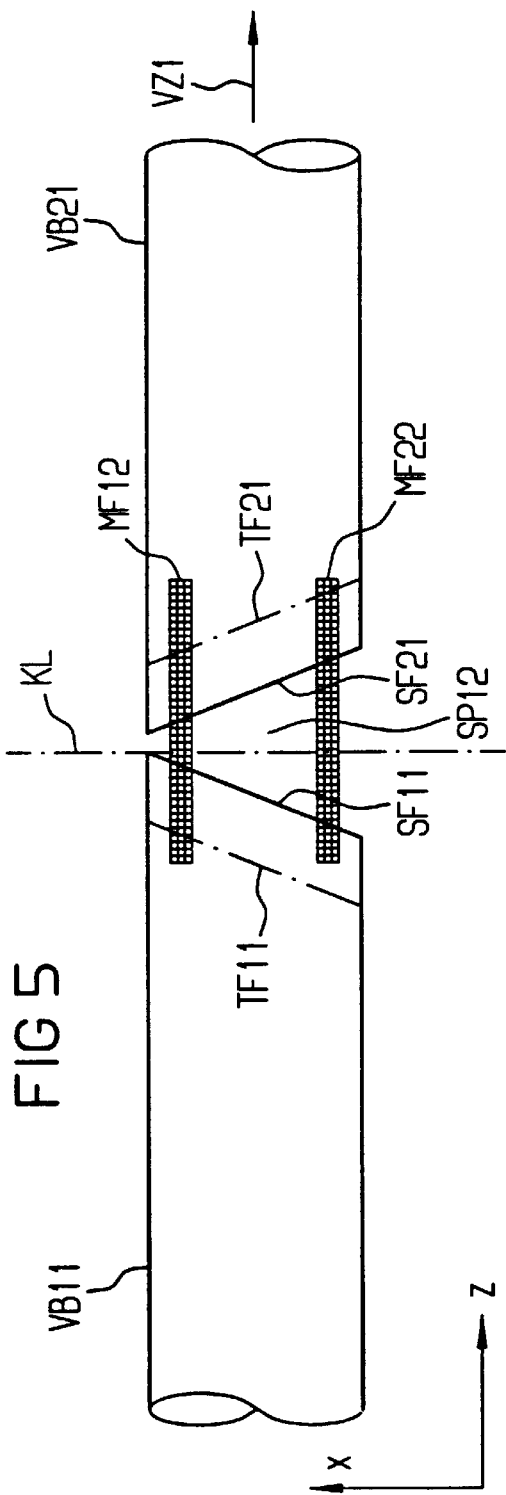
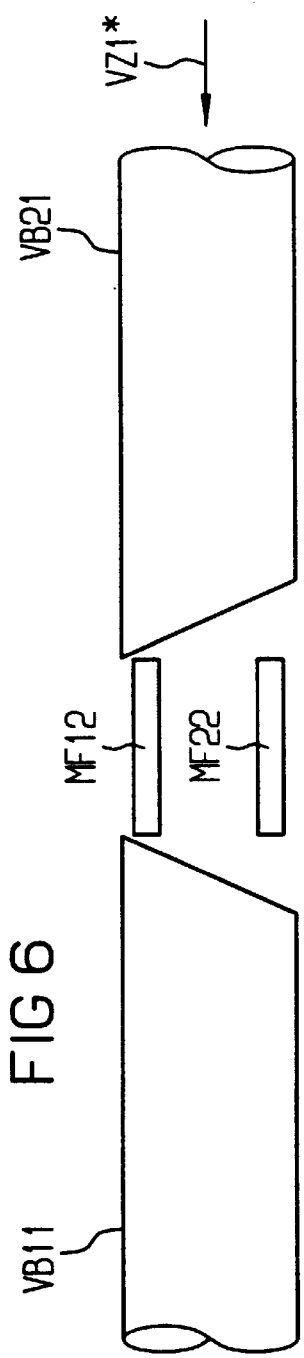

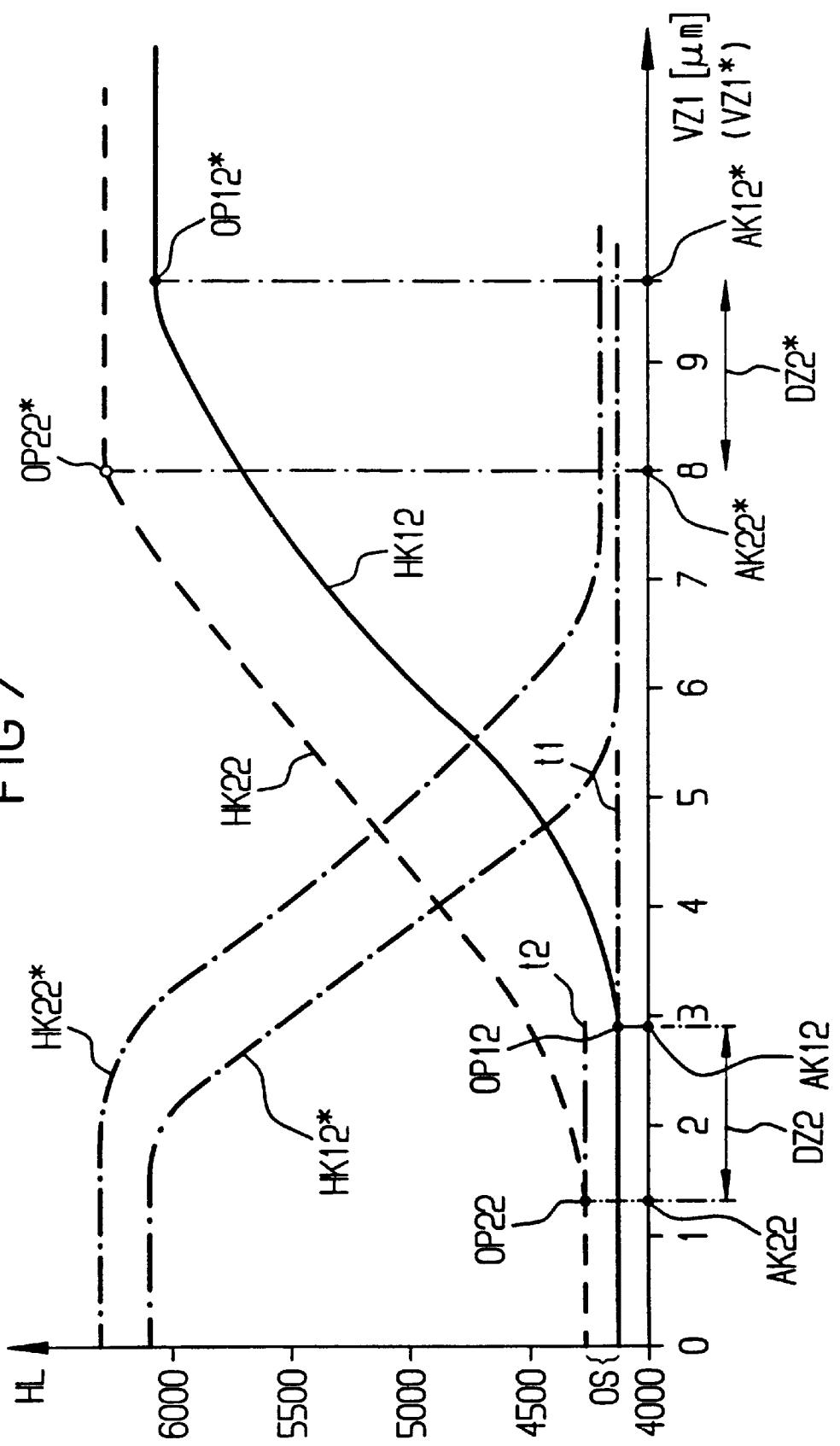

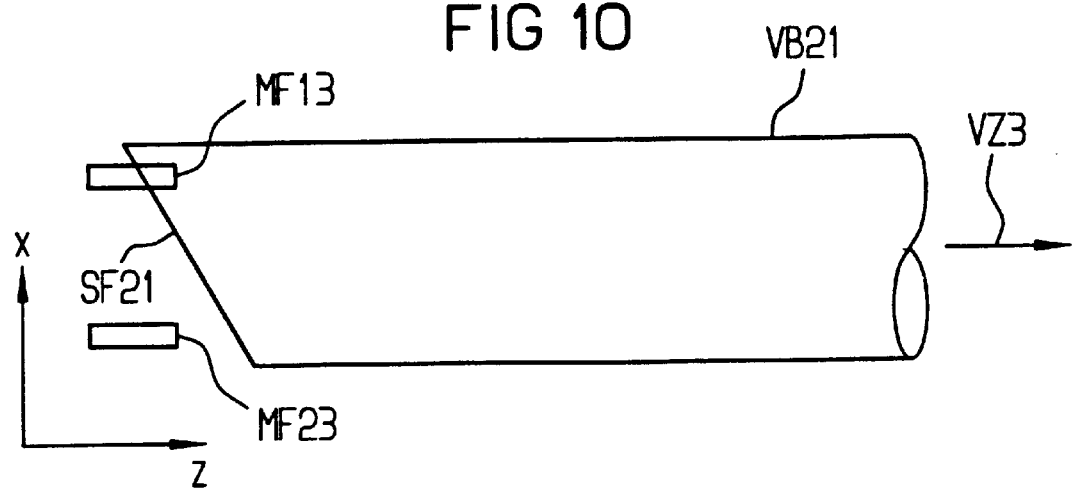
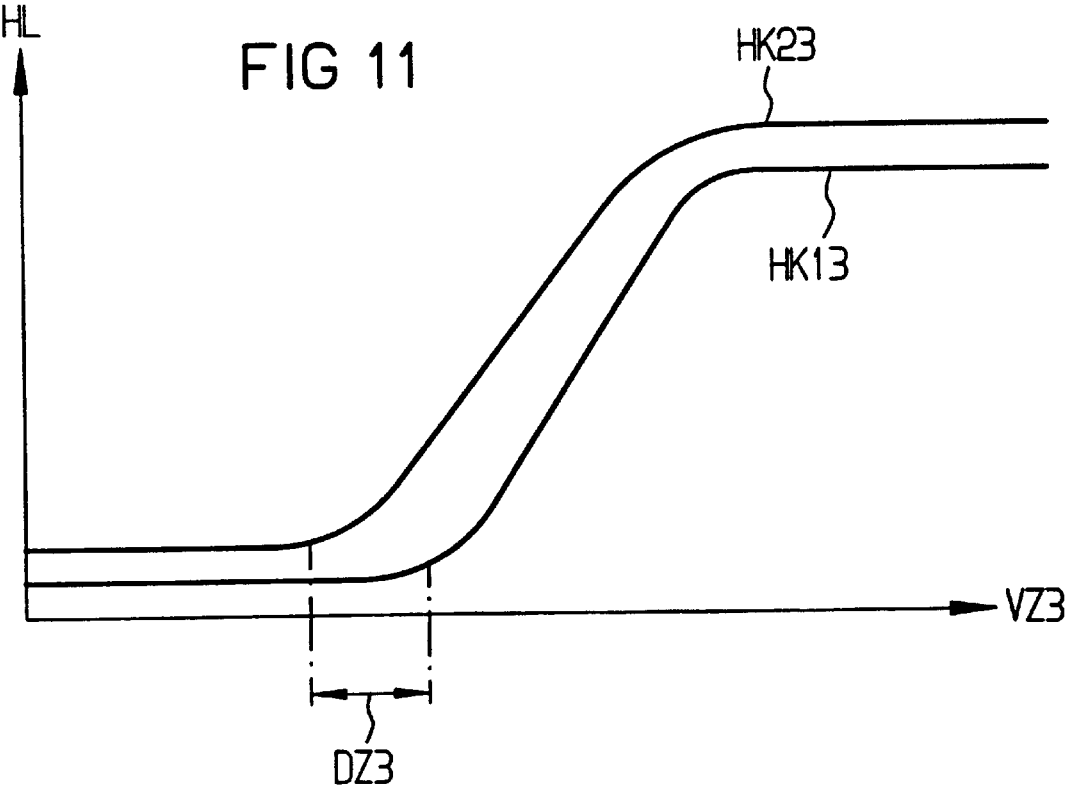

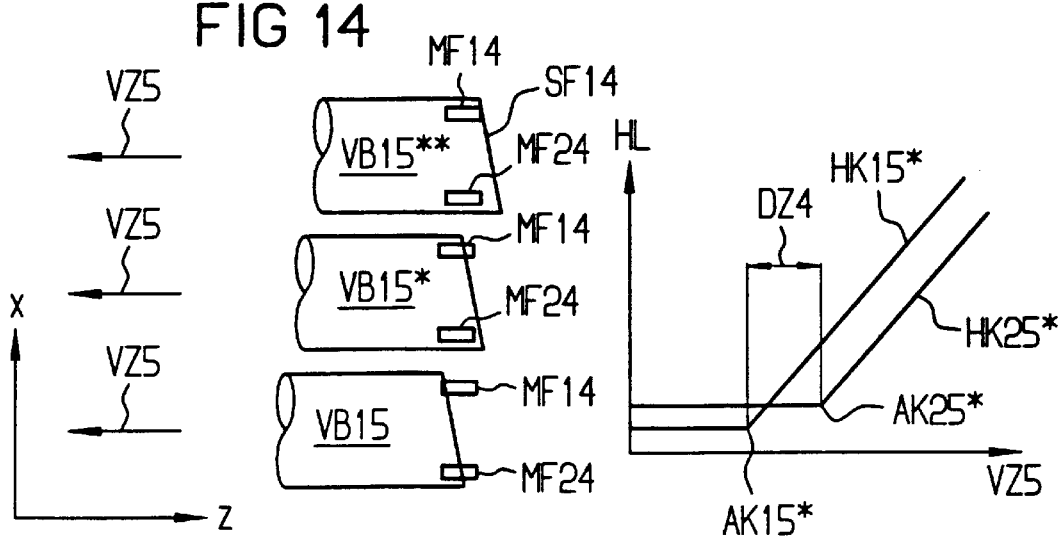
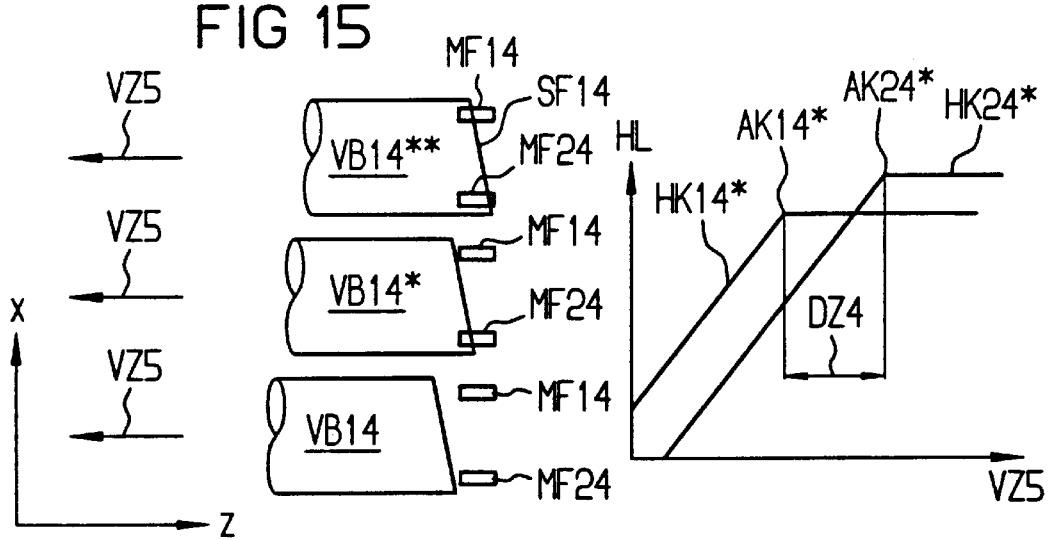

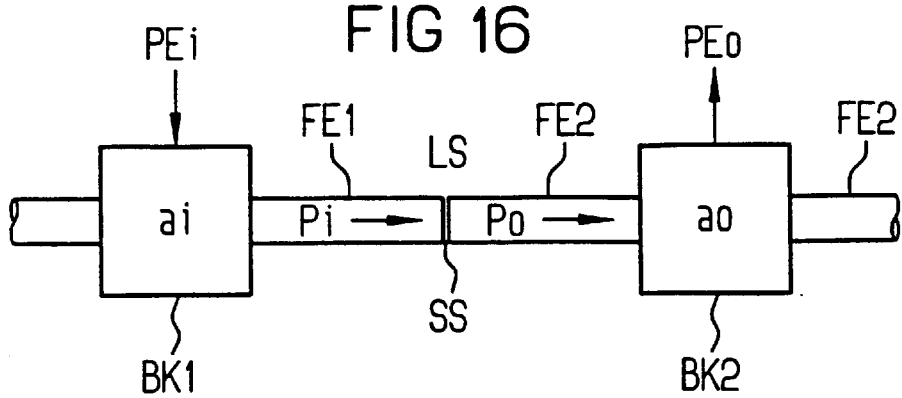
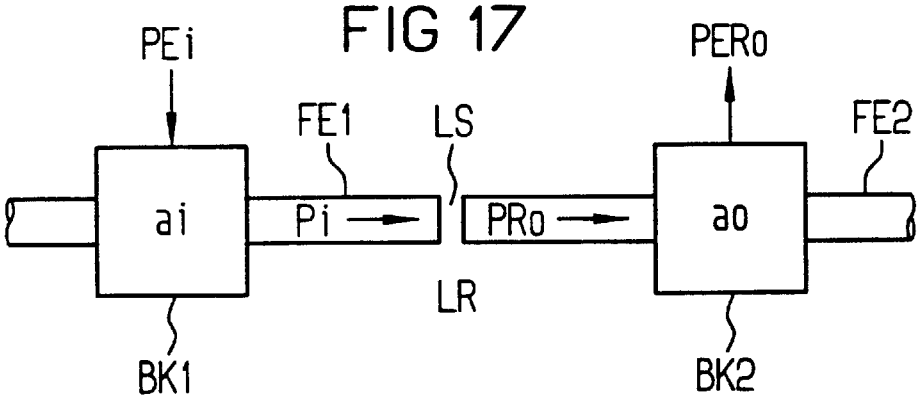
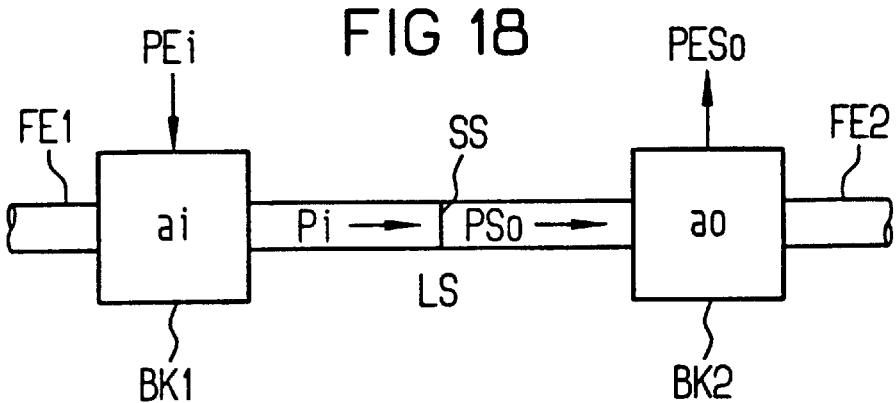

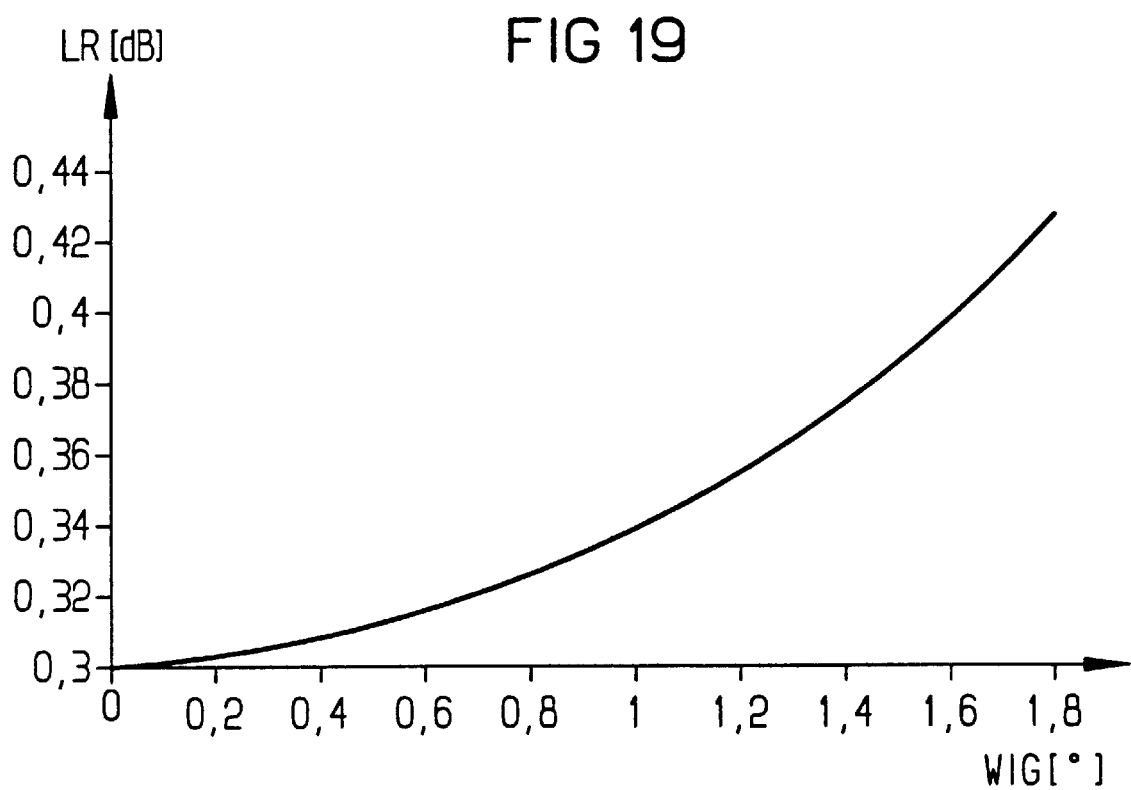

METHOD AND APPARATUS FOR ACQUIRING INFORMATION ABOUT AT LEAST ONE OPTICAL FIBER END

BACKGROUND OF THE INVENTION

The present invention is directed to a method for acquiring information about the end face of at least one optical fiber, wherein a fiber image is generated for a fiber end in at least one observation plane.

U.S. Pat. No. 5,011,259, which is incorporated herein by reference thereto and which claims priority from the same German Application as European 0 400 408, discloses a method for aligning two fiber ends. In this device, the two fiber ends, which reside opposite one another and are to be welded to one another, are illuminated, and the image which is generated in this way is then registered with an image sensor of a video camera. The fiber ends residing opposite one another at a fixed longitudinal spacing are scanned only along a single measuring line in a longitudinal fiber direction, so that only the gap width between the fiber ends can be identified. Information beyond this, such as, for example, the potential error angle of the end face of every individual fiber end, cannot be identified with this known measuring method that works with only a single measuring line in the longitudinal fiber direction.

SUMMARY OF THE INVENTION

The invention is based on the object of disclosing a way of how information about the end face of at least one optical fiber can be acquired in a more detailed fashion. In the method, this object is inventively achieved in that the fibers are brought into position with respect to at least two measuring or measurement windows so that the edge of the image of the end face in the respective plane of observation is acquired or crossed at least once by each measurement window at different edge locations. The intensity values of the measurement windows are thereby registered and offered for interpretation and the information about the fiber end face can then be derived by comparing the intensity values received from each of the measurement windows.

Only by this method does it become possible to obtain more measured information about the course of the respective fiber end face in a simple way. For example, a more detailed statement about the actual shape of the respective fiber end face is, thus, obtained.

Especially preferred, a potential angular error of the respective fiber end face can be identified and potentially explicitly indicated.

The invention is also directed to the method for acquiring information about the gap region of two optical fiber end faces residing opposite one another, whereby the fiber images are generated for the two fiber ends in at least one plane of observation. This method is characterized in that the fibers are brought into position relative to one another with reference to at least two measurement windows, with the edges of the image of the end face in the respective plane of observation being either covered or crossed at least once by, respectively, two measurement windows at different edge locations. The intensity values of the measurement windows are registered and offered for interpretation and the information about both fiber ends and the gap region are obtained by comparing the intensity value received from each of the measurement windows.

The invention is also directed to an apparatus for the acquisition of information about the end face of at least one optical fiber end, whereby the optical imaging means are provided for the fiber end in at least one plane of observation for generating a fiber image, the apparatus having positioning means provided so that the fibers having the edge of their imaged end face in the respective plane of observation can be covered or crossed at least once by at least two defined measurement windows at different edge locations and includes a calculating and evaluation means which is provided for registration as well as interpretation of the intensity values of the intensity received by the measurement windows so that information is derived about the fiber end face by comparing the intensity received from each of the measurement windows.

Other advantages and features of the invention will be readily apparent from the following description of the preferred embodiments, the drawings and claims.

BRIEF DESCRIPTION OF THE DRAWINGS

FIG. 4 illustrates a second position during the version of the method wherein the two shadowgrams of the two fiber ends are beginning to be moved apart;

FIG. 5 is a view similar to FIGS. 3 and 4 with the shadowgrams being moved apart;

FIG. 6 is a fourth position with the shadowgrams moved apart by a substantial amount so as to not register on either of the measurement windows;

FIG. 7 is a schematic illustration of a brightness diagram which can be registered given the inventive version illustrated by FIGS. 3–6 and for determining the overall angular error between the end faces of a fiber pair according to the method of FIGS. 3–6;

FIGS. 8–10 are schematic presentations of an embodiment of the method, with FIG. 8 showing both measurement windows being obscured by the shadowgram of the fiber end; FIG. 9 showing an intermediate position with one measurement window completely obscured by the shadowgram and the other measurement window partially exposed; and FIG. 10 showing a position with one measurement window completely free of the shadowgram while the other measurement window is partially covered;

FIG. 11 is a schematic illustration of the brightness diagrams obtained by the inventive version of FIGS. 8–10, which diagrams aid in determining the angular error of the end face of the individual fiber shown in FIGS. 8–10;

FIGS. 12–15 show another embodiment of the implementation of the method with reference to a schematic shadowgram of an individual optical fiber end, wherein FIG. 12 shows the fiber end moved from a position exposing both of the measurement windows through to a position of covering portions of the two windows; FIG. 13 illustrates a method wherein the initial position of the fiber shadowgram has both of the measurement windows partially covered and partially exposed and moves through various stages until both windows are completely covered; FIG. 14 shows a shadowgram from an initial position covering both of the measurement windows and being moved to a position uncovering both of the windows; and FIG. 15 illustrates a position starting with the shadowgram covering portions of both measurement windows and being moved to a position completely removed from both windows;

FIGS. 16–18 illustrate steps for attenuation measurement of two optical fiber ends to be welded to one another to form a splice connection with FIG. 16 showing the fiber ends being aligned for welding; FIG. 17 having the fiber ends spaced apart to determine connecting losses in the device; and FIG. 18 showing the determination of the fiber losses after splicing; and FIG. 19 is a graph showing the relationship through the angular error of the end faces of the fibers being spliced.

DESCRIPTION OF THE PREFERRED EMBODIMENTS

Figure 2:
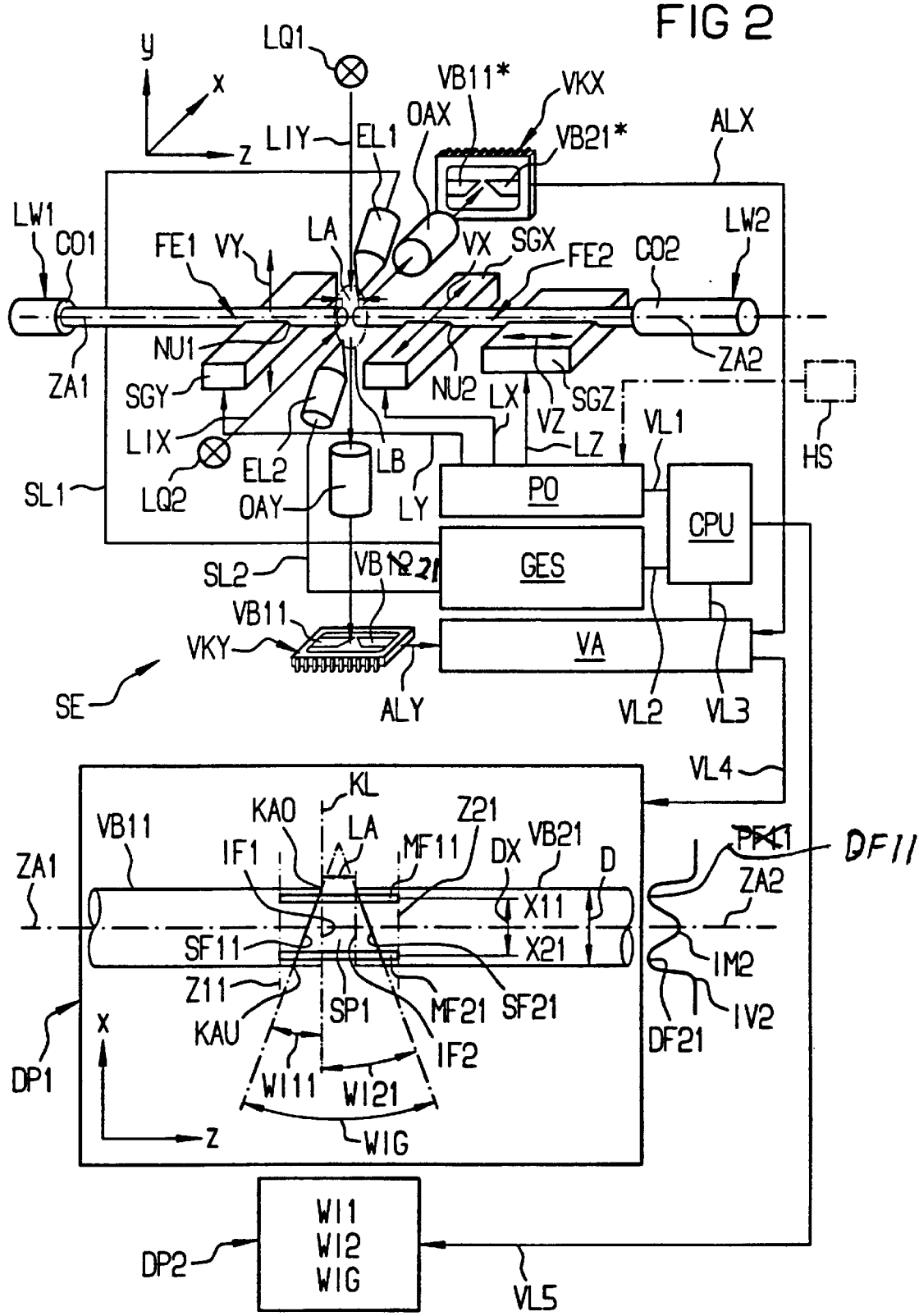
FIG. 2 is a partially perspective, schematic base view of a basic structure of an apparatus for the implementation of the inventive method.

The principles of the present invention are particularly useful when incorporated in a splicing device SE, generally indicated in FIG. 2.

Figure 1:
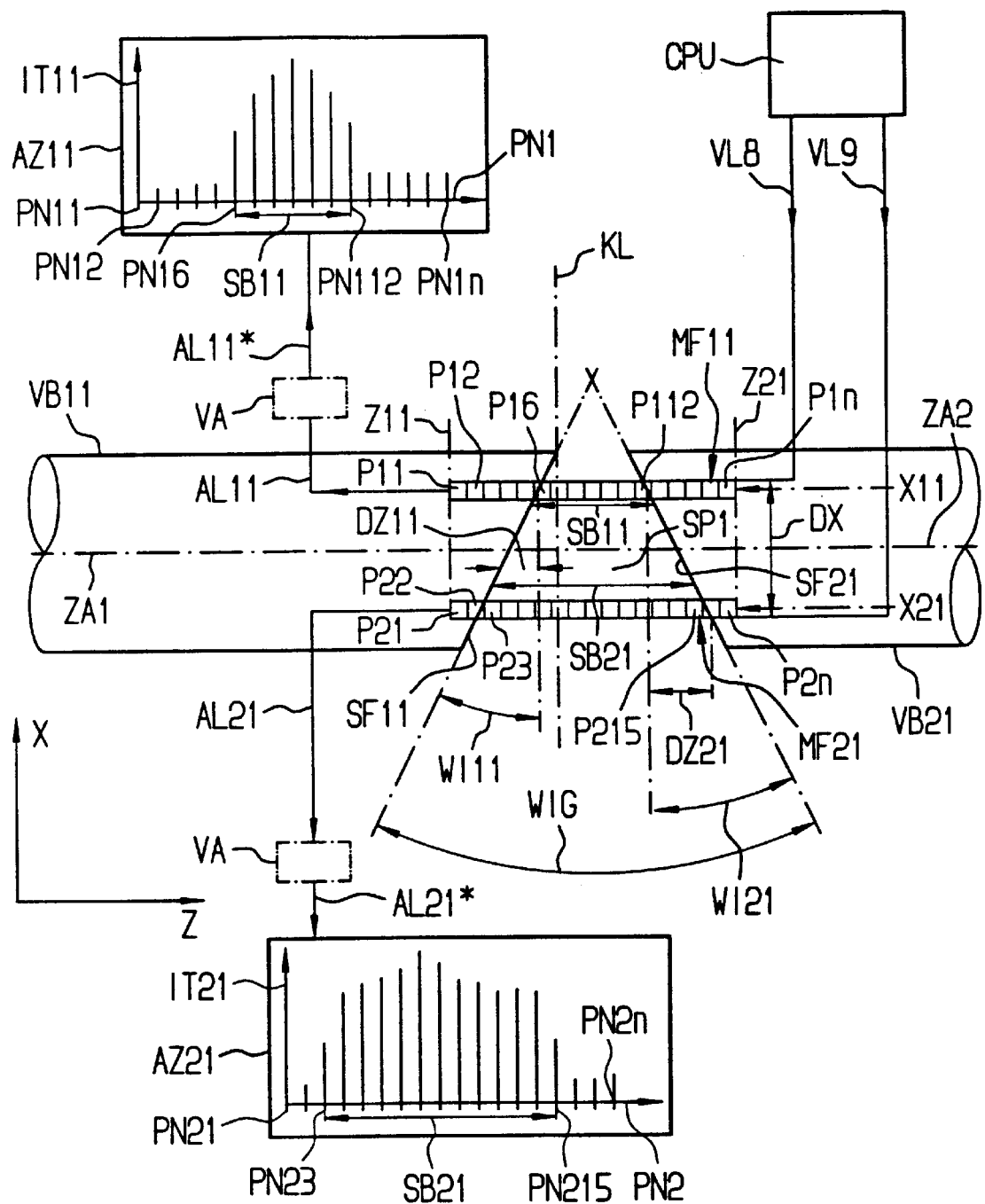
FIG. 1 is a magnified schematic view in a projection plane with a shadowgram of two light waveguide fiber ends residing opposite one another so that information about the end faces can be acquired according to a first version of the inventive method.

In a schematic as well as magnified illustration, FIG. 1 shows a projection plane X, Z in which two light waveguide fiber ends are imaged in the form of appertaining shadowgrams VB11, VB21. In particular, these fiber images VB11, VB21 can be acquired with the assistance of the optical pickup devices of a light waveguide splicing apparatus SE whose critical components are schematically shown in FIG. 2. The face ends of the first as well as the second light waveguide LW1, LW2 reside opposite one another therein with a prescribable, axial longitudinal spacing. The respective light waveguides LW1, LW2 preferably extends along a straight line. The outer plastic coating, which includes a primary and/or secondary coating, is removed along a prescribable end length in the end region of the respective light waveguides LW1 and LW2. The glass material of the optical fiber FE1 and FE2 of the respective light waveguides LW1 and LW2 are thus uncovered and bare in the end region thereof.

These uncovered optical fibers or fiber ends FE1 and FE2 are held in the welding means SE of FIG. 2 in at least respectively one allocated, appropriate holder or positioning means of a known type such as, for example, manipulators. In detail in the present example, the first optical fiber FE1 has the holder means SGY allocated to it and the second optical fiber FE2 has the holder means SGX allocated to it. In order to be able to align the ends of the two optical fibers FE1, FE2 residing opposite one another in a longitudinal direction in an optimum alignment with one another with respect to their outside contours and/or fiber cores before they are welded to one another, at least one of the two holder means SGY, SGX is fashioned displaceable in at least one spatial direction transversely, preferably perpendicularly or, respectively orthogonally, i.e., laterally relative to the respective longitudinal fiber axis. In FIG. 2, for example, the holder means SGY allows a movement in a Y-direction and the second holder means SGX allows a movement in an X-direction of a Cartesian coordinate system X, Y, Z. The displacement possibility of the first optical fiber FE1 in the Y-direction is thereby indicated by a double arrow VY and the displacement possibility of the second optical fiber FE2 in the X-direction is indicated by a double arrow VX.

In order to be able to move the fiber ends FE1, FE2 toward one another and contact them with one another in a longitudinal fiber direction for the later formation of a weld, the second optical fiber FE2 in FIG. 1, for example, has an additional holder or, respectively, positioning means SGZ allocated to it with which the optical fiber FE2 can be displaced in the longitudinal fiber direction, i.e., in the Z-direction, relative to the first optical fiber FE2, which is held stationary in the Z-direction. The displacement motion in the Z-direction is thereby indicated with a double arrow VZ. Every individual holder or positioning means LY, LX as well as LZ of the optical fiber welding means SE of FIG. 2 can be actuated and displaced in the respective spatial direction Y, X as well as Z, respectively, via an appertaining control line SGY, SGX as well as SGZ on the basis of a corresponding position control unit, particularly at least one actuator PO.

As warranted, the positioning means can also be respectively fashioned so that they can be manually moved into the respectively desired spatial position. In particular, the actuator PO can receive control signals for the corresponding adjustment of the positioning devices SGY, SGX as well as SGZ via a manual control HS that is indicated by dot-dashed lines in FIG. 2.

Viewed generally, thus, positioning devices are provided for the two optical fibers FE1, FE2 to be welded to one another and at least one of the positioning devices allows a displacement motion in the longitudinal fiber direction and/or at least a lateral displacement motion relative to the longitudinal fiber extent. Preferably, the holder or positioning means allow displacement motions of the two optical fibers in all three spatial directions, namely the X, Y, Z-directions of a Cartesian coordinate system. The spatial direction Z thereby indicates a longitudinal direction, i.e., the desired rated alignment line, along which the optical fibers FE1, FE2 are to be brought into alignment with one another with respect to their outside contour and/or fiber cores. The spatial direction X proceeds in the transverse direction relative to the longitudinal extent of the two optical fibers FE1 and FE2, particularly perpendicular, i.e., orthogonal to the spatial direction Z. The positioning devices SGY, SGX as well as SGZ of FIG. 2 preferably lie in a common positional plane that is arranged approximately parallel to the plane erected by the X as well as the Z-direction. The spatial direction Y resides perpendicular to this X, Z plane, i.e., it proceeds up or down.

The lateral alignment of the two fiber ends FE1, FE2 relative to one another as well as the setting of a defined longitudinal spacing between these two fiber ends can preferably ensue with the assistance of a central calculating and control means CPU. Via control line VL1, the control means CPU instruct the actuator PO to displace the respective holding means SGY, SGX as well as SGZ accordingly in the Y, X and Z-directions.

In order to be able to acquire an optical image for the respective optical fiber end FE1 or FE2 in at least one plane of observation and in order to be able to offer the image information thereof for interpretation, the optical fiber welding means SE of FIG. 2 comprises at least one optical imaging system. For generating projection images of the two fiber ends in, for example, the X, Z plane, light rays LIY are particularly directed essentially perpendicularly relative to the X, Z plane, i.e., in the Y-direction onto the two fiber ends FE1, FE2 with the assistance of the light source LQ1 of a first imaging system. An occlusion of the light rays LIY will occur due to the fiber ends FE1, FE2. A side view given a viewing direction in the Y-direction is thus respectively generated of the two fiber ends FE1, FE2. A light-emitting diode can preferably be provided as the light source LQ1. An imaging optics OAY, for example an objective or some other lens system, is arranged in the beam path of the light rays LIY in FIG. 2 at that side of the optical fibers FE1, FE2 lying opposite the light source LQ1. For the sake of graphic clarity, this imaging optics OAY has only been indicated as a single, circular-cylindrical lens. Via the imaging optics OAY of the first imaging system, the fiber ends FE1, FE2 have their shadows VB11, VB21 cast onto a surface or, respectively, imaged in an image plane that lies in the X, Z plane.

In this projection plane, the shadows or projections VB11 and VB21 of the fiber ends FE1, FE2 are acquired or, respectively, registered with the assistance of a pickup means VKY, particularly a scanner means, so that an intensity distribution is obtained for each fiber image or each shadowgram VB11, VB21. A video camera whose image sensor is, in particular, rectangularly fashioned is preferably provided as the pickup means VKY of the first imaging system. Given this transillumination of the optical fiber ends FE1, FE2, the respective, bare, i.e., cleanly decoated, optical fiber acts like a cylinder lens for the light penetrating through it. Functioning of this imaging system are disclosed in detail in U.S. Pat. No. 5,011,259. The pickup means VKY preferably comprises a field of light-sensitive elements, particularly photodiodes. These light-sensitive elements are arranged in a plurality of rows and columns that preferably lie perpendicular relative to one another. In particular, a field of what are referred to as CCD elements (coupled charge devices) is provided as the pickup means. In this way, the two fiber images VB11, VB21 are projected onto image portions of the X, Z observation plane as rectangular image portions which are acquired by a pixel-by-pixel scanning with the established, topical resolution of the light-sensitive elements of the scanner means VKY. In particular, the resolution of the pickup means VKY is thereby defined by the spacing as well as by the area size of its light-sensitive elements. One intensity or, respectively, brightness value of the projection image with the two fiber ends is thus respectively detected per pixel element of the scanner means VKY. The brightness or, respectively, intensity values of the image portion with the two fiber images acquired by scanning are transmitted via a line ALY to a memory means VA, particularly to a video image memory means, and are retained therein for interpretation purposes. The memory means VA can be driven for this purpose by the central calculating and control means CPU via a line VL3.

Control signals for matching the fiber ends to one another in the X, Z plane can be acquired with the assistance of the central calculating and control means CPU, which determines these signals from the intensity or, respectively, brightness values for the projection images of the two fiber ends FE1, FE2 deposited in the memory means VA. Subsequently, the calculating means CPU instructs the actuator PO via the control line VL1 to displace the holder means SGX in X-direction until the potential lateral offset of the fiber images VB11, VB21 has become zero in the X-direction, so that the alignment of the optical fibers is then largely aligned in the X, Z plane with respect to their fiber cores and/or outside contours.

In addition to or independently of the projection images of the two fiber ends FE1, FE2 in the X, Z observation plane, images of the two fiber ends FE1, FE2 can also be potentially generated in another positional plane, such as, for example, the Y, Z plane. To that end, the light rays LIX of the light source LQ2 of a second imaging system of the light waveguide welding means SE of FIG. 2 are directed in the X-direction perpendicular to the Y, Z plane and are directed onto the two fiber ends FE1, FE2 such that these are illuminated. The light rays occluded by the fiber ends FE1, FE2 are imaged in a projection plane lying in the Y, Z plane with the assistance of an imaging optics OAX, particularly an objective, at that side of the fibers lying opposite the light source LQ2. Projection images or shadowgrams VB11*, VB21* in the Y, Z plane are acquired for the two illuminated fiber ends FE1, FE2 with the assistance of a pickup means VKX corresponding to the pickup means VKY in a way analogous to that for the X, Z projection plane. The pickup means VKX comprises, in particular, a planar, approximately rectangular field composed of a plurality of light-sensitive elements, particularly photodiodes. These are preferably arranged in rows and columns lying at a right angle relative to one another. The image portion in the Y, Z observation plane acquired by the pickup means VKX is thus rastered into a plurality of sub-pickup areas. A brightness intensity value of the projection image of the two fiber ends VB11*, VB21* can thus be generated per light-sensitive element. The intensity values of the fiber images VB11*, VB21* are thus acquired pixel-by-pixel with the established resolution of the pickup means VKX. The image information is transmitted via a line ALX to the memory means VA and is offered thereat for interpretation with the assistance of the calculating means CPU. The calculating means CPU can, in particular, derive control signals for the matching of the fiber ends to one another in the Y, Z plane from the registered intensity or, respectively, brightness values of the two fiber images VB11*, VB21*. Subsequently, the calculating means CPU then instructs the actuator PO via the control line VL1 to displace the positioning means SGY in the Y-direction until the potential lateral offset of the fiber images VB11*, VB21* has become zero in the Y-direction. The two optical fibers can thus also be aligned largely in alignment with one another in the Y, Z observation plane with respect to the fiber cores and/or outside contours.

A multi-dimensional matching of the two fiber ends, i.e., their alignment relative to one another in a plurality of different positional planes, can be undertaken in this way.

In particular, a potential, overall radial offset of the two fiber ends relative to one another can be largely eliminated in that the two fiber ends are imaged in at least two planes of observation and are brought into alignment with one another. These two planes of observation, such as, for example, the X, Z as well as the Y, Z projection plane, preferably reside perpendicularly relative to one another.

As warranted, it can likewise already be adequate to provide holding devices for the two fibers FE1, FE2 that are stationarily arranged in the lateral direction with respect to the longitudinal fiber axes, i.e., that do not allow any trans-axial displacement motions but only relative motions of the two fiber ends in the longitudinal fiber direction relative to one another. The two holder devices SGX, SGY can thus also be stationarily installed, i.e., immobile, in the welding means SE of FIG. 2. Given this simplified embodiment of the light waveguide welding means SE, the holder devices, such as, for example, SGY, SGX are expediently permanently aligned—in the factory—relative to one another so that their insertion channels NU1, NU2 for the two fibers FE1, FE2 are in optimum alignment with one another.

At both sides of the longitudinal extent of the two exposed optical fibers FE1, FE2, the welding means SE of FIG. 2 respectively comprises at least one welding electrode EL1 or EL2, and the two welding electrodes EL1, EL2 are arranged at longitudinal sides of the optical fibers FE1, FE2 that lie opposite one another. In particular, the welding electrode EL1 lies opposite the welding electrode EL2 offset by approximately 180°. The two welding electrodes EL1, EL2 serve as thermal heat source and are thereby allocated such to the interspace between the two holder devices SGY, SGX that what is referred to as an arc can respectively form between them as a result of glow discharges trans-axial, particularly perpendicular to the longitudinal extent of the optical fibers FE1, FE2. The position of the region in which a respective arc propagates between the two electrodes EL1, EL2 is indicated with the assistance of a dot-dashed ellipse LB in FIG. 2. The two welding electrodes EL1, EL2 are connected via corresponding power lines SL1, SL2 to a glow discharge generating means GES, particularly to a voltage source of a pulse generator, for generating voltage pulses. The drive of the glow discharge generating means GES can thereby ensue via a control line VL2 with the assistance of the calculating and control means CPU.

The relative position of the two fiber images in the respective plane of observation relative to one another is visualized with the assistance of display devices, particularly a display DP1, given the welding means SE of FIG. 2. To that end, the display means DP1 is connected to the memory means VA via a data line VL4. The display DP1 displays the images VB11, VB21 of the two fiber ends FE1, FE2, for example in the X, Z plane of observation, namely in a condition after the two fiber ends FE1, FE2 have already been respectively largely aligned with one another in the X as well as in the Y-direction but do not yet contact one another at their end faces. In the display DP1 of FIG. 2, the dot-dashed straight line KL marks the desired rated joint location or, respectively, contacting location for the end faces SF11, SF21 of the two fiber images VB11, VB21 in the X, Z plane. This rated joint line KL essentially extends in the X-direction and simultaneously forms a desired rated symmetry line for the overall arrangement of the two fibers directly at their imaginary, face-end contacting. The Z-direction forms the desired rated alignment line of the two fiber ends FE1, FE2 in the Z-direction.

A largely planar fiber end face, on which the central axis ZA1 or, respectively, ZA2 of the respective fiber ends FE1 and FE2 resides essentially perpendicularly, is preferably selected as rated end face of the respective fiber end. In the display DP1 of FIG. 2, the image of such an idealized fiber end face is respectively indicated dot-dashed in the X, Z plane of observation both for the first fiber end FE1 as well as for the second fiber end FE2 and is provided with the reference character IF1, IF2. In the respective plane of observation, for example in the X, Z projection plane, the ideal fiber ends IF1 and IF2 thus preferably respectively comprise a projection image having an optimally rectangular outside contour. Viewed spatially, this means that an optimally circular-cylindrical geometrical shape having planar end face is ideally desired for the respective fiber end, the central fiber axis forming a surface normal for this end face and the central fiber axis proceeding through its center point. Given such ideal fiber ends, the end faces would come into contact axially symmetrically as well as largely surface-wide thereat with respect to the contacting line KL, i.e., the visibly imaged edges of ideal end faces IF1, IF2 in the respective plane of observation would touch one another essentially along their entire projection width on the rated contacting line KL.

In practice, however, fiber ends comprise end faces having more or less pronounced deviations from this desired rated end face form IF1, IF2. In FIG. 2, the image VB11 of the first fiber end FE1 exhibits a planar end face SF11 in the X, Z plane of observation that is skewed by an error angle WI11 relative to the desired 90° end face IF1. The central fiber axis ZA1 thus no longer forms a surface normal relative to the skewed end face SF11. With reference to the desired rated joint line KL, the upper long side of the first fiber image VB11 projects beyond the lower long side thereof. Whereas the upper edge of the fiber image VB11 extends to the joint line KL, the lower longitudinal fiber edge already ends at an axial longitudinal distance from the joint line KL. The upper edge of the fiber image VB11 is referenced KAO in the display DP1 and the lower edge is reference KAU. The upper edge KAO is connected to the lower edge KAU via the slanting straight line SF11. In the X, Z plane of observation, this is the slanting, planar end face SF11. Since the upper edge KAO projects farther in the direction toward the joint line KL than the lower edge KAU, a triangular overhang is formed at the end face of the first fiber end FE1. Compared to the ideal fiber image IF1 with the rectangular shape wherein the end face proceeds essentially parallel to the contacting line KL in the X-direction, the end face SF11 is thus slanted by the error angle WI11. The planar end face surface SF11 thus resides skewed by the error angle WI11 relative to the desired 90° end face IF1. The resultant end face error angle WI11 becomes all the greater the greater the axial longitudinal distance between the upper and the lower cleavage edge KAO, KAU at opposite long sides of the fiber image VB11. In the X, Z image plane, the visible edge of the end face SF11 (viewing from left to right) proceeds as a slanting straight line from bottom left to upper right. This first fiber image VB11 thus lacks a triangular surface region compared to the ideal, rectangular projection image IF1.

The image VB21 of the second fiber end FE2 also exhibits an approximately planar end face SF21 that is skewed by a specific error angle WI21 relative to the desired 90° end face IA2. The visible edge of the skewed end face SF21 thereby proceeds along a slanting straight line from bottom right to upper left in the display DP1 (given a view from right to left). The second fiber end FE2 thus likewise lacks a triangular surface region at its end face compared to the ideal rectangular image IF2.

The visible edges of the end faces SF11, SF21 thus run toward one another. Their imaginary extensions, which are entered dot-dashed in the display DP1, thus intersect. They describe an overall error angle WIG that is composed of the sum of the individual error angles of the fiber end faces, so that WIG=WI11+WI21 applies. In the display DP1, the first fiber image VB11 is shifted to such an extent in the Z-direction that its end face SF11 initially comes into contact with the rated contacting line KL, which is indicated dot-dashed. Since its upper, end face corner or, respectively, cleavage edge KAO projects farthest in the Z-direction relative to the rest of its outside contour, the edge KAO initially comes into contact with the contacting line KL. This upper corner KAO of the first fiber image VB11 has the upper end face corner or, respectively, cleavage edge of the second fiber image VB21 residing opposite it at the axial longitudinal spacing LA. This upper corner of the second fiber end face SF21, compared to the rest of its outside contour viewed in the Z-direction, likewise projects farthest into the interspace between the two fiber ends residing opposite one another. Since the fiber end faces SF11, SF21 in the X, Z plane of observation do not proceed parallel to the contacting line KL in the X-direction but converge, an interspace SP1 that expands toward the same long side of the fiber arrangement occurs between the two fiber ends. In the present example, the interspace SP1 expands from the upper edges of the two fiber images VB11, VB21 aligning in the Z-direction toward their lower edges aligning in the Z-direction. The lacking material triangles at the end faces of the fiber images VB11, VB21 thus enlarged toward the same long side of the fiber arrangement. Since the two fiber images VB11, VB21, as viewed along their upper long sides, reside opposite one another with an axial longitudinal spacing LA, i.e., their two fiber end corners projecting farthest toward one another lie at the axial longitudinal spacing LA from one another, a trapezoidal gap interspace occurs between the two fiber images VB11, VB21.

In the X, Z observation plane, thus, both the first fiber end as well as the second fiber end is respectively projected as a stripe extending on a straight line that has its end cut at an angle. The respective fiber image VB11, VB21 thereby exhibits a trapezoidal outside contour at the end side. What this means, in other words, is that the long sides of the respective, stripe-shaped fiber image VB11 or, respectively, VB21 are formed by straight lines that proceed essentially parallel to the central fiber axis ZA1 or, respectively, ZA2 and that are arranged at a radial spacing therefrom. In the display DP1, the two long sides of the fiber images VB1, VB21 preferably lie axially symmetrically relative to one another with respect to the central axis ZA1 or, respectively, ZA2.

In order to then be able to acquire information about the actual course of the respective fiber end face and/or about the gap between the two fiber ends lying opposite one another at the prescribable longitudinal spacing LA, the respective fiber is brought such into position with respect to at least two measurement windows so that the edge of the imaged end face in the respective plane of observation is acquired or crossed at least once by each measurement window at different edge locations.

In the display DP1 of FIG. 2, for example, two measurement windows MF11, MF21 are defined therefor within a stripe of the X, Z plane of observation that is limited by the imaginary extensions of the long sides of the fiber images VB11, VB21. The first measurement window MF11 is allocated to the upper edge limitation of this stripe proceeding in the longitudinal fiber direction and the second measured window MF21 is allocated to the edge zone of this stripe lying opposite, i.e., the lower edge zone proceeding in longitudinal fiber direction. With reference to the longitudinal axes ZA1, ZA2 of the two fibers FE1, FE2, the two measurement windows MF11, MF21 are thus arranged laterally offset relative to one another by a prescribable transverse distance DX. The trans-axial distance DX of the two measurement windows MF11, MF21 is preferably selected between 0.2 and 0.9 times the trans-axial width D of the respective fiber image VB11 or VB21, for example the imaged outside fiber diameter. The extent of the respective measurement window MF11 or, respectively MF21 is selected greater in longitudinal fiber direction than transversely relative to the longitudinal axis ZA1 or ZA2 of the fibers FE1 or FE2. Approximately the same surface shape is selected for the two measurement windows MF11, MF21. The first as well as second measurement window MF11, MF21 is respectively imaged as a narrow, rectangular stripe. Both measurement windows MF1, MF21 extend essentially parallel to one another. They are allocated to approximately the same longitudinal locations along the fiber longitudinal extents, i.e., in the Z-direction here. Each measurement window MF11 MF21 has its long sides proceeding essentially parallel to the outside contours proceeding in longitudinal fiber direction, for example the long sides of the two fiber images VB11, VB21.

At least two measurement windows are thus defined in different lateral heights transversely, particularly perpendicularly to the longitudinal fiber extent, i.e., in the X-direction here, within a stripe of the respective plane of observation, here the X, Z plane of observation, that is limited by the imaginary extensions of the long sides of the respective fiber image. Within this stripe, the two measurement windows MF11, MF21 preferably lie as far apart as possible as viewed in the X-direction.

In fiber longitudinal direction, i.e., in the Z-direction here, the respective measurement window MF11 and MF21 preferably extends at least so far that it bridges the gap between the two fiber images VB11, VB21 in the Z-direction at the window trans-axial position X11 and X21 (FIG. 1) and thereby still simultaneously covers the end face edges SF11, SF21 of the two fiber images. In detail, the first measurement window MF11 bridges the clearance SB11 of the gap SP1 between the two end faces SF11, SF21 (see FIG. 1) in the Z-direction viewed along the line X11 and thereby simultaneously covers at least the two end face edges. The second measurement window MF21 bridges at least the clearance SB21 of the gap SP1 between the two end faces SF11, SF21 of the fiber images VB11, VB21 at the trans-axial position X21 and thereby simultaneously covers at least the two end face edges (see FIG. 1).

The two measurement windows MF11, MF21 proceed essentially parallel to one another. They are allocated to approximately the same longitudinal locations along the fiber longitudinal extents in the Z-direction. Both measurement windows MF11, MF21 thus begin at the same Z-longitudinal location Z11 and end at the same Z-longitudinal location Z21. They thus extend over the same length in the Z-direction, namely from Z11 to Z21. Viewed perpendicular to the respective longitudinal fiber extent, i.e., in the X-direction, the two measurement windows MF11, MF21 are allocated to different X-positions, i.e., they are laterally offset relative to one another, particulary in the radial direction, with reference to the central fiber axes ZA1, ZA2.

Since the respective optical fibers FE1 or, respectively, FE2 act like a cylinder lens for the light passing through them, their fiber image does not appear uniformly bright in practice in the transverse fiber direction. The intensity distribution when scanning transverse to the longitudinal fiber extent is explained in detail below by way of example with reference to the intensity curve IV2 (FIG. 2) for the second optical fiber FE2. The brightness profile IV2 of the second fiber image VB21 in the X-direction is thereby additionally co-entered in the right half of the image of FIG. 2 next to the display DP1 for the sake of a clearer illustration. The intensity IV2 is high outside the shadow region VB21, which is outside the diameter region of the fiber end FE2, because the light of the light source LQ1 can propagate completely unimpeded here. As soon as the outer edge of the shadowgram VB21 is reached, the intensity distribution drops very strongly, i.e., relatively suddenly. However, the intensity IV2 does not remain constant over the entire diameter region D covered by the shadow but reaches a maximum preferably in the middle of this shadow region. The cylindrical shape of the optical fibers, namely, causes a bright focal line IM2 here in the center of the projection image VB21. Toward the other edge of the shadow area VB21, a drop of the intensity IV2 again occurs symmetrically relative to the focal line IM2, and the intensity IV2 again arises abruptly to the original brightness value after leaving the shadow region or, respectively, shadowgram VB21. The two measurement windows MF11, MF21 are expediently positioned in the region of the longitudinal edges of the fiber images VB11, VB21, for example where the fiber images respectively exhibit a dark edge stripe. As a result thereof, it can be advantageously assured that the two measurement windows MF11, MF21 lie at locations of approximately identical brightness viewed in the transverse direction of the fiber images VB11, VB21. The measurement window MF11 is thereby allocated to the upper, dark edge zone, such as, for example, DF11, and the second measurement window MF21 is allocated to the lower, dark edge zone, such as, for example, DF21, of the intensity profile of the fiber images, such as, for example, IV2. As a result thereof, a type of balance of the two measurement windows is achieved with respect to the registered intensity values when both measurement windows MF11, MF21 were to lie completely within the shadow area of the fiber images. In a first proximation, approximately the same basic brightness in the intensity profile of the fiber images is thus allocated to the measurement windows MF11, MF21. In detail, the first measurement window MF11 is positioned at the X location X11 and the second measurement window is positioned at the X location X21 at the transverse spacing DX therefrom. X11–X21=DX thus applies.

In a schematic, enlarged view, FIG. 1 shows the two fiber images VB11, VB21 of the projection image in the display DP1 of FIG. 2. Each measurement window MF11 or MF21 here is respectively formed by an individual measurement line in the longitudinal fiber direction in FIG. 1. In detail, the first measurement window MF11 comprises a plurality of measurement cells P11 through P1n that are arranged in longitudinal fiber direction, i.e., in the Z-direction here along an imaginary connecting line. Light-sensitive elements, particularly photo elements, are preferably provided as measurement cells P11 through P1n. Each measurement cell P11 through P1n preferably comprises a rectangular detector surface that converts the light incident on it into a corresponding electrical measured signal dependent on the respective intensity. The individual measurement cells P11 through P1n of this first measuring line are thereby preferably arranged next to one another gap-free. Each measurement cell thus forms a pixel element that has its cell area acquiring a sub-portion of the respective projection image in the X, Z plane of observation and supplies representative measured intensity value therefor. In this way, it is possible to scan the X, Z plane of observation pixel-by-pixel along the measurement line of the first measurement window MF11 and to thereby respectively register a measured intensity value for the respective projection light per pixel element that is incident onto the detection surface. In FIG. 1, the first measurement line MF11 exhibits such a great extent in the longitudinal fiber direction that, at its X-position X11, it crosses the gap width SB11 thereat between the two imaged fiber end faces SF11, SF21 and also projects into the shadowgram VB11 as well as into the shadowgram VB21. The measurement window MF11 thus crosses both the edge of the imaged end face SF11 of the first fiber FE1 as well as the projected end face edge SF21 of the second fiber FE2. The first measurement window MF11 thus makes it possible to acquire measured intensity values pixel-by-pixel in the transition region between the first shadowgram VB11 to the gap space SP11 between the two fiber images VB11, VB21 over this gap space SP1 itself as well as over the transition zone between the gap space SP1 and the second fiber shadowgram VB21 at the X-location X11 along a straight-line measurement line having a prescribable length in the longitudinal fiber direction. In FIG. 1, the individual pixel elements P11 through P1n of the first measurement line are activated and/or deactivated via a control line VL8 proceeding from the central calculating and control means CPU. With the assistance of the central calculating and control means CPU, the first measurement window MF11 can be instructed via the control line VL8 to read the measured intensity values of the pixel elements P11 through P1n out and to forward them to the memory means VA of FIG. 2 via a data line AL11. In FIG. 1, the memory means VA is merely indicated dot-dashed for the sake of graphic clarity.

Via a data line AL11*, the registered measured intensity values can be transmitted from the memory means VA to a display means AZ11 to be displaced and visualized thereat. The display means AZ11 shows a diagram in a schematic illustration along whose abscissa PN1 the numbers PN11 through PN1n of the pixel elements P11 through P1n are entered at equidistant intervals. The pixel numbers PN11 through PN1n have the measured intensity values of the pixel elements P11 through P1n along the ordinate IT11 of the diagram allocated to them. Whereas the pixel elements P11 through P15 lie entirely in the fiber shadowgram VB11, the pixel element P16 acquires the edge of the fiber end face SF11, i.e., partially acquires the fiber image VB11 and partially acquires the gap space SP1. A higher intensity value is thus allocated to the pixel element P16 than to the pixel elements P11 through P15. Viewed farther from left to right in the Z-direction, the pixel elements P17 through P111 then respectively lie entirely in the bright gap space SP1. Their allocated measured intensity values are therefore higher than the measured intensity value for the pixel element P16. The end face edge of the second fiber image VB21 is incident onto the detection surface of the pixel element P112, so that a drop in the light intensity again occurs thereat since the pixel element P112 partially covers the gap space SP1 and partially covers the fiber shadowgram VB21. The following pixel elements P113 through P1n, finally, lie completely in the shadowgram VB21 of the second fiber FE2. Measured intensity values that are lower than the measured intensity values of the pixel elements P16 through P111 as well as P112 are thus allocated to elements P113 to P1n. Viewed in the Z-direction, an intensity change from dark to bright thus occurs upon transition of the first fiber image VB11 to the gap space SP1 and subsequently from bright to dark in the transition zone from the gap space SP1 to the second shadowgram VB21. The pixel element at which the change from dark to bright occurs thus identifies the end face edge of the first fiber image VB11. The change from bright to dark following in the Z-direction can be allocated to that pixel element P112 on whose surface the end face edge SF21 of the second fiber shadowgraph VB21 is imaged. The plurality of pixel elements P16 through P112, i.e., those pixel elements that exhibit higher measured intensity values than the other pixel elements, then indicate a measured quantity for the width SB11 of the gap SP1 at the X11 location of the measurement window MF11. Given knowledge of the pixel size in the Z-direction, the gap width SB11 in the X, Z plane of observation can even be explicitly indicated in that the plurality of pixel elements with higher intensity values is multiplied by the pixel width of a pixel element. In particular, a corresponding Z-location can be allocated to those pixel elements, such as, for example, P16, P112, on which the end face edges SF11 and SF21 of the respective fiber image are incident.

Since the gap space SP1 steadily widens from the upper to the lower edge limitation of the fiber images VB11, VB21, i.e., its axial gap width constantly increases in the Z-direction, the two end faces edges SF11, SF21 cross the second measuring line MF21 at Z-locations that are offset farther toward the outside onto the ends of the measuring line MF21 compared to the crossing locations at the first measuring line MF11. In FIG. 1, the edge of the end face SF11 is already projected onto the third pixel element P23, whereas the edge of the imaged end SF21 intersects the detection surface of the third pixel element P215 from the end. The second measuring line MF21 thus extends over such a length in the Z-direction that it extends beyond the gap width thereat and crosses both the edge of the imaged fiber end face SF11 as well as the imaged end face edge SF21. As viewed in axial direction, the plurality of pixel elements P21 through P2n of the second measuring line MF21 thus supplies a topical intensity distribution that co-covers the intensity values of the transition region between the first fiber image VB11 and the gap SP1, of the gap SP1 itself as well as of the transition region between the gap SP1 and the second fiber image VB21. Due to the enlarged gap width SB21 at the X-location X21 of the second measuring line MF21, more pixel elements lie in the bright gap space SP1 now compared to the intensity profile of the first measuring line MF11. Only the first two pixel elements P21, P22 as well as the last two pixel elements P2n−1, P2n that fall into the shadowgrams VB11 and VB21 have lower intensity values allocated to them compared to the other pixel elements P23 through P215. A change from dark to bright occurs in the Z-direction viewed from left to right at the pixel element P23 that is crossed by the end face edge SF11. Conversely thereto, a change in the brightness from bright to dark occurs at the pixel element P215 that lies at the boundary between the bright gap space SP1 and the dark shadowgram VB21. Analogous to the first measuring line, the second measuring line can likewise be driven by the central calculating and control means CPU via a control line VL9. The individual measured intensity values in its plurality of pixel elements P21 through P2n can be separately read out via a data line AL21 and be supplied to the memory means VA of FIG. 2. For the sake of graphic simplicity, the memory means VA is merely indicated dot-dashed in the data line AL21 in FIG. 1. Via line AL21*, the individual intensity values can be transmitted pixel-by-pixel to a second display means AZ21 that schematically illustrates the topical intensity distribution of the pixel elements P21 through P2n. The numbers PN21 through PN2n of the pixel elements P21 through P2n are entered along the abscissa of the second display means AZ21. The appertaining measured intensity values of the pixel elements P21 through P2n are allocated to the pixel numbers PN21 through PN2n along the ordinate IT21. The pixel elements of the second measuring line MF21 that lie approximately in the middle of the gap exhibit the highest measured intensity values. When an abrupt rise or drop of the intensity distribution respectively occurs at a pixel element, it identifies the position of the respective fiber end face edge SF11 or, respectively, SF21. The plurality of pixel elements PN23 through PN215 in the gap space SP1 that exhibit higher measured intensity values compared to the other pixel elements of the second measuring line MF21 then forms a criterion for the width SB21 in the Z-direction at the X21 location of the gap SP1. In particular, the gap width SB21 can be explicitly calculated in that the sum of pixel elements appearing bright in the gap SP1 is multiplied by the axial extent of a pixel element in Z-direction.

In this way, the assistance of at least two measurement windows that are laterally offset relative to one another transversely relative to the longitudinal fiber extent makes it possible to acquire a plurality of measured information about the gap space of two fiber ends residing opposite one another. In particular, the error angle WI11 or angle WI21 of the respective fiber end face SF11 or SF21 can be determined as warranted from the topical intensity distributions of the two measurement windows. In order, for example, to obtain the error angle WI11 of the end face SF11, the differential plurality of pixel elements that lie between the detection location of the first end face edge SF11 at the first measuring line MF11 and the detection location of the end face edge SF11 at the second measuring line MF21 is determined. Whereas the end face edge at the first measuring line MF11 is incident onto the sixth pixel element P16, it is already projected onto the third pixel element P23 at the second measuring line MF21. Viewed from the first to the second measuring line, thus, the end face edge is offset by approximately three pixel values in the Z-direction. By what distance DZ11 the end face edge SF11 at the X-position X21 is offset relative to the X-position X11 in axial direction can thus be determined. The error angle WI11 can then be determined according to the relationship WI11=arctan (DZ11/DX), whereby DX indicates the lateral spacing of the two measuring lines MF11, MF21 in the X-direction and DZ11 indicates the axial offset that the end face edge SF11 exhibits between the two measuring lines MF11, MF21.

The plurality of pixel elements by which the intersection location of the end face edge SF11 at the second measuring line MF21 is offset in axial direction relative to the intersection location at the first measuring line MF11 can, as warranted, be identified in an especially simple way in that the intensity distribution of the first measuring line MF11 is correlated with the intensity distribution of the second measuring line MF21. Preferably, the topical intensity distributions of the two measuring lines are cross-correlated with one another. The location of greatest relationship between the two intensity distributions is reached where this cross-correlation function respectively exhibits a maximum. The displacement path allocated to this maximum then forms a criterion for the axial offset of the respective end face edge in its course from the first to the second measuring line.

The axial offset of the end face edge can be especially simply determined as warranted in that the plurality of pixel elements is determined from the topical intensity distributions IT11, IT21 that lie between the pixel numbers PN16, PN23, i.e., between those pixel numbers of the two intensity distributions IT11, IT21 whereat a significant brightness boost respectively occurs.

Analogous thereto, the error angle of the end face SF21 of the second fiber image VB21 can also be determined in that the numbers of those pixel elements from the intensity distributions IT11, IT21 are identified whereat an abrupt drop of the intensity values from bright to dark respectively occurs. The difference value between the pixel numbers whereat a brightness transition from bright to dark derives is then a criterion for the axial offset of the end face SF21 on its path from the first measuring line MF11 to the second measuring line MF21. The end face angle WI21 is preferably determined in a first approximation according to the relationship WI21=arctan DZ21/DX, whereby DZ21 indicates the axial distance of the end face SF21 in the Z-direction between the two measuring lines MF11, MF21 and DX indicates the lateral transverse distance of the two measuring lines from one another in the X-direction.

Since the only thing of concern is the relative positional offset of the fiber edge in the Z-direction, it is not necessary to identify the actual Z-longitudinal location of the fiber end face edge. It suffices to identify the position difference of the end face edge in the Z-direction at the two measuring windows MF11, MF21. As a criterion for the lateral distance DX and of the two measurement windows MF11, MF21, in particular, it can already suffice to count the plurality of pixels between the X-positions of the two measurement windows MF11, MF21. It is then adequate for identifying the lateral offset of the fiber end face to determine the difference sum of those pixel values that lie between those pixel elements of the first and second measuring lines that are intersected by the respective end face edge.

Viewed generally, thus, the respective fibers as well as at least two measurement windows given this first version of the inventive measurement principle are positioned relative to one another so that the imaged end face edge of the fibers is simultaneously covered by at least two measurement windows at different edge locations. The two measurement windows thereby lie within a stripe of the respective plane of observation that is limited by the imaginary extensions of the long sides of the respective fiber image. With reference to the longitudinal axis of these fibers, the at least two measurement windows are defined offset relative to one another laterally by a prescribable transverse distance. In this way, the edge of the imaged end face of the respective fibers is covered or crossed at least once by each of the at least two measurement windows at different edge locations. The topical intensity distributions of these measurement windows are registered and offered for interpretation. By comparing their measured intensity values, information about the respective fiber end face can then be derived. In particular, it is possible to obtain information about the gap space between two fiber ends residing opposite one another. It is enabled in an especially advantageous way to determine a potential error angle of the end face for the respective fiber end. Over and above this, the gap width between two fiber ends residing opposite one another can be specified in fiber longitudinal direction at different transverse locations, i.e., at at least two or, respectively, at more transverse locations. Further, statements about the actual course of the respective fiber end face are possible. To that end, it is especially expedient to provide more than two measurement windows laterally offset relative to one another in transverse direction of the fiber images. Potentially, statements about the cross-sectional geometrical shape of the gap space are possible between the two fiber ends residing opposite one another.

In particular, the respective measurement window can be defined in the respective plane of observation by a corresponding plurality of pixel elements whose measured intensity values are readout for interpretation and these values are retained. The window is selected in the image excerpt of the respective pickup means such as, for example, VKY of FIG. 2 with the assistance of the calculating and control means CPU. Given employment of, for example, a video camera, it can be especially expedient to select a sub-set from the plurality of light-sensitive elements of the image sensor as the measurement window. Preferably, the respective measurement window can be defined by a plurality of pixel elements that lie along a scan line of the image sensor in the longitudinal fiber direction. Start and end of the measurement window are thereby expediently selected so that the end face edge of the respective fiber image is crossed as viewed in the longitudinal fiber direction. Given two fibers lying opposite one another, the respective measurement window preferably simultaneously acquires both their end face edges.

In an especially advantageous way, the overall angular error WIG between the two faces SF11, SF21 converging toward one another can be determined from the topical intensity distributions of the two measuring lines MF11, MF21 of FIG. 1. The two measuring lines MF11, MF21 as well as the end face edges SF11, SF21 frame a trapezoidal portion of the gap space SP1. The corner points of this trapezoidal area are formed in FIG. 1 by the pixel elements P16, P112 of the first measuring line MF11 as well as by the pixel elements P23, P215 of the second measuring line MF21. Given the assumption of error angles of approximately the same size for the end faces SF11, SF21, the overall angular error WIG can be determined according to the following relationship in a first approximation:

$$WIG = \arctan((SB21 - SB11)/DX).$$

The individual error angles WI11, WI21 and/or the overall angle WIG given the welding means SE of FIG. 2 can be explicitly displayed with the assistance of a display means DP2 (FIG. 2) and, particularly, a display that is separately provided. The display means DP2 is connected to the central calculating and control means CPU via a line VL5 for this purpose.

With reference to schematic shadowgrams of the two fiber ends FE1, FE2 of FIG. 2 to be welded to one another, FIGS. 3–6 show further, particularly preferred versions of the inventive method with which information about the respective fiber end face can be acquired with greater measuring position compared to the measuring principle of FIG. 1. FIGS. 3–6 thereby show the images VB11, VB21 of the fiber ends FE1, FE2 in the X, Z plane of observation of FIG. 2 by way of example.

Figure 3:
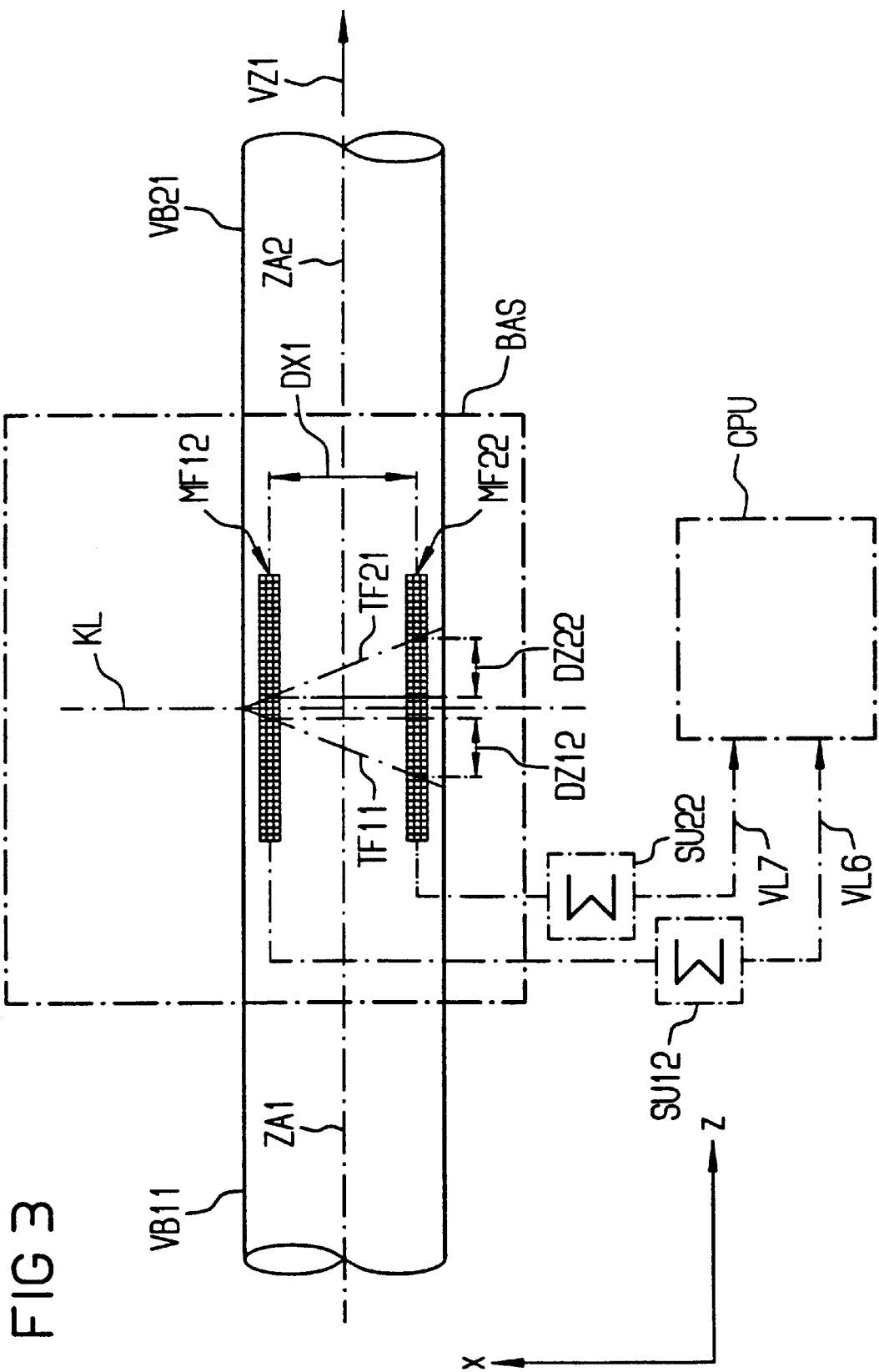
FIG. 3 illustrates the first step of a position of two optical fibers during practicing of a version of the inventive method in which the schematic shadowgrams of the two fiber ends are positioned opposite one another.

For implementation of this first preferred method version or embodiment, the two fiber ends FE1, FE2 are initially moved toward one another to such an extent along their longitudinal fiber extent, i.e., in the Z-direction here, that their fiber images VB11, VB21 merge largely gap-free into one another. What this means, in other words, is that the two fiber images VB11, VB21 are combined to form a uniform stripe, as illustrated in FIG. 3, and the stripe continuously extends in the longitudinal fiber direction, i.e., in the Z-direction. The long sides of this stripe lie parallel to one another. The two fiber ends FE1, FE2 are thus brought together so that an illumination light can no longer pass through between them. Low bright gap space is thus present between the two dark fiber images or, respectively, shadowgrams, VB11, VB21. In particular, the gap space between the two fiber ends FE1, FE2 of FIG. 2 can be caused to disappear in that the second fiber end FE2 of FIG. 2 is moved toward the first fiber FE arranged stationary in the Z-direction with the assistance of the positioning means SGZ. Due to diffraction phenomena at the end face edges of the two fiber ends, light no longer penetrates through the gap space when the fibers are brought together even before the fiber ends physically contact or touch. The fiber images VB11, VB21 become invisible in the X, Z plane of observation and thus define a type of optical fiber ends. The optical fiber end of the respective fiber thereby projects beyond its physical, actual fiber end due to diffraction and refraction effects at the fiber end face edge. In particular, the optical end of the respective fiber is lengthened between 0.5 and 5 $\mu$m, preferably by about 1.5 $\mu$m relative to the physical fiber end thereof. That axial longitudinal distance whereat light no longer penetrates through the fiber gap during the converging motion of the two fiber ends is referred to as "gap closure" within the scope of the invention. It thus identifies the condition of the fiber projection images wherein a bright gap no longer appears between the two fiber end faces. This axial longitudinal spacing then corresponds to the touching of optical fiber ends. In FIG. 3, the course of the actual, physical end faces of the two fibers FE1, FE2 is additionally entered as dot-dashed lines. The physical fiber end faces are thereby referenced TF11 for the first fiber FE1 as well as TF21 for the second fiber FE2. The physical fiber ends TF11, TF21 just touch one another at the rated contacting line KL with their upper, face-side fiber corner.

Two measurement windows MF12, MF22 are defined within a stripe of the X, Z plane of observation that is limited by the long sides of the fiber images VB11, VB21 of FIG. 3 merging gap-free into one another. The two measurement windows are offset laterally relative to one another by a prescribable transverse distance DX1 with reference to the longitudinal axes of the fibers. Both measurement windows MF12, MF22 are allocated to the transition region between the two fiber images VB11, VB21. A respective measurement window is positioned in the proximity of one of the two long sides of the shadow stripe VB11+VB21. In FIG. 3, the first measurement window MF12 is allocated to the upper edge limitation of the shadow stripe and the second measurement window MF22 is allocated to the lower edge limitation of the shadow stripe. Expressed in general terms, the two measurement windows MF12, MF22 are positioned within the dark shadow stripe of their two fiber images VB11, VB21 merging into one another so that they exhibit an optimally great transverse distance from one another in the X-direction, i.e., perpendicular to the longitudinal fiber extent. The two measurement windows MF12, MF22 are defined essentially parallel to one another. Start and end of the two measurement windows MF12, MF22 are respectively allocated to approximately the same axial longitudinal locations, i.e., approximately the same Z-longitudinal locations. The two measurement windows MF12, MF22 are defined essentially axially symmetrically relative to one another with reference to the aligning fiber central axes ZA1, ZA2. They both exhibit approximately the same surface shape, a rectangular shape here. In FIG. 3, the extent of the respective measurement window MF12, MF22 in longitudinal fiber direction is selected greater than transversely relative to the longitudinal fiber extent. In FIG. 3, the respective measurement window MF12 or window MF22 covers a rectangular area with privileged direction in the longitudinal fiber direction. This detection surface is respectively composed of a plurality of light-sensitive elements or pixel elements. Within the respective measurement window, these pixel elements are organized in a plurality of rows in the longitudinal fiber direction that lie congruently side-by-side in the X-direction. In FIG. 3, for example, the respective measurement window comprises three measurement rows lying side-by-side in the X-direction. These measurement rows are respectively formed by pixel elements that, as viewed in the Z-direction, lie next to one another along an imaginary connecting line.

The respective measurement window MF12 or MF22 can preferably be formed by separate detection elements that are separately correspondingly positioned in the X, Z plane of observation as components. Expediently, the two measurement windows MF12, MF22 can be defined in that respectively corresponding pixel elements from the totality of pixel elements of the large-area rectangular image sensor VKY of FIG. 2 are selected that cover the two fiber images VB11, VB21. In FIG. 3, the rectangular image portion of this image sensor BAS is additionally entered with dot-dashed lines. The two fiber images VB11, VB21 thereby meet only at a part of their overall area.

The numbers of the pixel elements of the respective measurement window MF12, MF22 can preferably be defined with the assistance of the central calculating and control means CPU of FIG. 2. To that end, the calculating and control means CPU drives the memory means VA, which retains the entire projection image with the two fiber images VB11, VB21 in the X, Z plane of observation, in corresponding fashion via the control line VL3. The intensity values of the pixel elements within the respective measurement MF12 or MF22 are read out respectively separately with the assistance of the calculating and control means. The calculating means CPU then forms a sum value from the intensity values of the respective measurement window MF12 or MF22 and offers this for further interpretation.

The sum value of the measurement intensity values of all pixel elements of the respective measurement window MF12 or MF22 is preferably retained in the memory means VA. In FIG. 3, the measured intensity values of the plurality of pixel elements of the first measurement window MF12 are read out via a data line VL6 into which an adder SU12 is inserted. This adder SU12 adds the measured intensity values of the first measurement window MF12 and forwards this sum value to the calculating means CPU. Corresponding thereto, the measurement intensity values of the plurality of pixel elements or measurement cells of the second measurement window MF22 are added up with the assistance of an adder SU22 and this sum value is transferred to the calculating means CPU via a data line VL7. This sum value of the measured intensity values of the second measurement window MF22 is preferably deposited in the memory means VA of FIG. 2 that is connected to the calculating means CPU via the data line VL3.

In order to be able to respectively measure the overall intensity level of the light that is incident onto the respective measurement window in the respective plane of observation, it can also potentially be expedient to respectively provide only a single large-area detector surface as the measurement window. Such a detector then directly supplies the overall intensity sum of the light that is incident on it, so that the adders SU12, SU22 can be eliminated.

Proceeding from this fiber position wherein a "gap closure" is present, the two fiber ends are now moved away from one another relative to one another. In the present exemplary embodiment, the second fiber FE2 is moved away from the first fiber end FE1 in the Z-direction, which is illustrated by an arrow VZ1, with the assistance of the positioning means SGZ. When the two fiber ends FE1, FE2 are moved apart, the gap space between the fiber images VB11, VB21 does not open simultaneously over the entire fiber cross-section and not immediately over the entire length of the fiber cross-section in the X-direction. The physical end faces TF11, TF21 of the two fiber ends, namely, reside at an overall angle WIG relative to one another as viewed in the X, Z plane. When the two fiber ends are moved apart, the gap space therefore first begins to open proceeding from that edge of the dark stripe of the two fiber images VB11, VB21 merging into one another at the point where the end face edges of the two physical fiber ends lie farthest apart from one another in the axial direction. A wedge-shaped, particularly triangular gap space opens in the region around the contacting line KL proceeding from the lower long side of the continuous shadow stripe of the two fiber images VB11, VB21 of FIG. 3 merging into one another.

When the two fiber ends FE1, FE2 are moved apart in the Z-direction, these ultimately arrive in a relative position relative to one another wherein the lower, second measurement window MF22 first acquires the gap opening SP1 opening up proceeding from the underside of the fiber images, as illustrated in FIG. 4. Proceeding from the lower long sides of the fiber images VB11, VB21, a gap space SP11 opens in the region of the contacting line KL in the transverse fiber direction, i.e., in the X-direction. This gap space SP11 is acquired by the second measurement window MF22 that is allocated to the lower edge zone of the shadowgrams VB11, VB21. A sub-set of the pixel elements of the second measurement window MF22 is thus directly impinged by illumination light without shadowing by the fibers and therefore no longer appears dark like the rest of the pixel elements of the second measurement window MF22 impinged by the shadowgrams VB11, VB21. In this relative position of the fiber images of FIG. 4, the measured intensity values of the second measurement window MF22 are summed up and offered for interpretation as an aggregate value. Compared to the second measurement window MF22, the pixel elements of the first measurement MF12 at the edge zone of the fiber images VB11, VB21 lying opposite continue to be dark since a gap space does not open up at the positional location of the first measurement window MF12. The intensity values of the first measurement window MF12 are likewise summed up in the fiber position of FIG. 4 and offered for interpretation as aggregate value.

When the second fiber end is moved even farther away from the first fiber end in the Z-direction, then the gap space SP11 of FIG. 4 widens in the transverse fiber direction toward the first measurement window MF12 until the gap space ultimately extends over the fiber cross-section. FIG. 5 shows the two fiber images VB11, VB21 with such a gap space SP12 extending over the entire fiber cross-section. The projected end face of the first fiber image VB11 is referenced SF11 in the gap space therein. The imaged end face of the second fiber image VB21 is referenced SF21. The gap space SP12 is triangularly fashioned in a first approximation. It now also covers the first measurement window MF12. A sub-set of the pixel elements of the first measurement window MF12 is thus impinged by illumination light. In this fiber position of the two fiber ends FE1, FE2, the aggregate intensity value of the first measurement window MF12 is identified and offered for interpretation. Corresponding thereto, the aggregate intensity value of the second measurement window MF22 is analogously determined and likewise offered for interpretation.

FIG. 7 illustrates the curve of the aggregate intensity values of the two measurement windows MF12, MF22 dependent on the distance VZ1 of the second fiber end FE2 from the first fiber end FE1. The displacement path VZ1 is thereby entered along the abscissa of the diagram, whereas the ordinate of the diagram has the respective aggregate intensity values HL of the two measurement windows allocated to it. When the two fiber ends are continuously moved apart and the sum of the intensity values is thereby continuously registered in the respective measurement window, then an appertaining aggregate intensity curve HK12 derives for the first measurement window MF12 and an appertaining aggregate intensity curve HK22 entered with broken lines derives for the second measurement window MF22. As long as the two fiber images completely overlap one another and a gap is not yet visible in the fiber cross-section (see FIG. 3), the aggregate intensity values of the two measurement windows MF12, MF22 remain largely dark given the displacement motion of the second fiber end away from the first fiber end. Both measurement windows, namely, are still completely shadowed by the fiber images VB11, VB21 over their entire detection surface. The respective measured curve HK12, HK22 therefore initially exhibits a constant, i.e., horizontal initial curve in FIG. 7 of their aggregate intensity values at the beginning of the parting of the fibers.

Given continuing parting of the two fiber ends, a gap ultimately opens between the two fiber images and initially migrates only into the second measurement window MF22 when the fiber ends are continued to be moved apart in the transverse fiber direction. Beginning at this distance of the second fiber from the first fiber, a clear increase in the aggregate intensity values in the second measurement window MF22 therefore occurs.

When, finally, the two fiber ends have moved so far apart that a further increase in the illuminated detected surface is no longer possible for the second measurement window MF22, then constantly high aggregate intensity values are measured proceeding from this fiber distance. The window MF22, namely, is maximally illuminated, i.e., a further increase of its overall intensity level is then no longer possible.

The measured curve HK22 thereby comprises three significant curve sections while the fibers are being moved apart:

At the beginning of the parting motion VZ1, the measured level curve HK22 proceeds essentially horizontally and at an approximately constant level. The measurement level is thereby lowest at this location of the measured curve HK22 since the entire detection surface of the second measurement window MF22 is occluded by the shadowgrams of the fibers.

As soon as the gap space propagating in the X-direction covers the second measurement window MF22 given continued parting of the fiber ends, the overall intensity level of the second measurement window increases steadily since more and more surface components of the second measurement window are affected by the gap space becoming larger in the X and in the Z-direction. The middle section of the measured curve HK22 is thus formed by a function curve that rises with increasing fiber distance VZ1. Between the horizontal starting section and the middle sub-section, the measured curve HK22 thereby exhibits a type of breaking or turning point OP22.

The last sub-section of the measured curve HK22, finally, is again approximately formed by a horizontal. Beginning with a certain point in time of the fiber parting, namely, no further increase in surface portions of the second measurement window that could be additionally illuminated brightly by the widening gap occurs. The overall intensity level of the second measurement window then remains approximately constant. The measured curve HK22 thereby exhibits a type of breaking or turning point OP22* between the middle, rising sub-section and the horizontal, end section.

For example, the condition of the second measurement window MF22, which condition has light passing through the opening fiber gap SP12 and impinging the second measurement window MF22 during the fiber parting, can thus be unambiguously identified from this aggregate intensity curve HK22 of the second measurement window MF22. This brightness distribution in the second measurement window can, for example, be determined in that the imaginary extensions t2 of the horizontal initial course of the measured curve HK22 is formed. Where this imaginary extension line t2 of the measured curve HK22 last contacts the contacting point OP22 then unambiguously determines precisely that moment in the parting of the fiber ends at which the second measurement window is initially covered by the gap successively opening in the X-direction. This contact point OP22 has the fiber displacement path AK22 allocated to it.

The measured curve HK12 of the first measurement window MF12 is fashioned similar to the measured curve HK22. In particular, it is composed of three corresponding, characteristic sub-sections. Since, differing from the second measurement window MF22, the first measurement window MF11 is only covered by the trans-axially spreading gap space at a later point in time compared to the second measurement window MF22, it remains dark longer than the second measurement window MF22. A longer starting section wherein the measured curve HK12 proceeds horizontally thus initially occurs for the aggregate intensity value measured curve HK12 of the first measurement window MF12. A gap opening between the two fiber ends can only be registered in the first measurement window MF12 after the two fiber ends have been moved by a further distance DZ2 compared to their distance AK22 given the gap opening registered by the second measurement window MF22. The imaginary extension of the horizontal sub-section of the measured curve HK12 is entered as a dot-dashed line t1 in FIG. 7. Viewed in the abscissa direction, it contacts the measured curve HK12 to the last time at the contacting point OP12. The displacement path or point AK12 is allocated to this contacting point OP12. Beginning from this fiber distance AK12, more and more pixel elements of the first measuring row are illuminated by the widening gap, so that a rise in brightness occurs. This brightness rise of the measured curve HK12 only decays and merges into a horizontal after the two fiber ends have been moved so far apart that no further pixel elements of the first measurement window come to lie in the gap space and are impinged by illumination light. Since the first measurement window is covered only later by the widening gap space between the two fiber ends while they are being moved apart, the measured curve HK12 lies offset approximately by DZ2 in the abscissa direction relative to the measured curve HK22.

The measured curve HK12 thereby lies under the measured curve HK22. The reason for this is that the second measurement window MF22 is allocated to that gap zone wherein the physical fiber ends reside farthest apart in the axial direction. Even when the two fiber ends have been brought together to such an extent that a complete optical "gap closure" already occurs over the entire fiber cross-section due to light diffraction and/or refraction effects, but the two physical fiber ends do not yet contact one another, the transition region between the two fiber images appears brighter in the second measurement window MF22 than in the first measurement window MF12.

The following comparison between the two measured intensity curves HK12, HK22 can, in particular, be expedient for the simultaneous acquisition of information above the fiber end faces of the two fiber ends FE1, FE2:
The condition of the second measurement window MF22 wherein a change from dark to bright occurs is registered from the measured curve HK22. Proceeding from this condition, the displacement path by which the two fiber ends are additionally moved apart in order to also be able to register a change from dark to bright at the first measured window MF12 is then determined. The displacement path DZ2 by which the two fiber ends are additionally moved farther apart proceeding from their fiber position whereat a gap opening occurs for the first time at the second measurement window in order to also obtain gap opening chronologically later at the first measurement window MF12 then corresponds to the overall offset of the fiber end faces in the longitudinal fiber direction measured from one to the other measurement window.

In FIG. 3, the axial offset DZ12 between the two measuring lines MF12, MF22 is additionally entered for the end face TF11 and referenced DZ12. The individual axial offset of the end face SF21 between the two measurement windows MF12, MF22 is likewise additionally entered as a dot-dashed line DZ22 in FIG. 3. The additional displacement path DZ2 determined from the measured curves HK12, HK22 of FIG. 7 then forms the sum of these two, individual axial end face offsets, so that DZ2=DZ12+DZ22 applies. Since the transverse distance DX1 of the two measurement windows MF12, MF22 is known in the transverse direction, i.e., in the X-direction, the overall error angle WIG between the end faces of the two fiber ends can be determined according to the relationship WIG=arctan (DZ2/DX1).

Expressed generally, the progress of the gap opening when the two fibers are moved apart is thus observed in at least two transversal locations in the transition region between the two fiber images. In particular, the path difference is determined by the two fiber ends being additionally moved apart in order, proceeding from a first gap opening at one of the two measurement windows and to be able to register a gap opening at the second measurement window. To that end, the two fiber ends are first brought into an initial position wherein both measurement windows lie completely within the fiber images. At least one of the fibers is then moved away from the other fiber, so that a gap space spreads from one fiber edge surface to the other. The point in time during the fiber parting when a brightness change from dark to bright initially respectively occurs in the first as well as in the second measurement window is registered during the parting of the fiber ends. This is the point in time of the fiber parting whereat the respective measurement window is first covered by the widening gap. When a time offset occurs between these dark/bright changes of the two measurement windows, then the fiber end faces have an angular error relative to one another. With reference to the brightness rise in the first measurement window, thus, the two fiber ends are moved so far apart that a brightness change from dark to bright also occurs in the second measurement window. For determining the displacement path DZ2 by which the two fiber ends are additionally moved apart in order to also be able to register a gap opening time-delayed at the second, other measurement window, the observation of a single brightness condition in the respective measurement window thus already suffices.

In order to be able to determine the offset DZ2 of the two measured curves HK12, HK22, it can potentially also be expedient to acquire that condition in the respective measurement window beginning with which a noteworthy change in aggregate intensity no longer occurs. In FIG. 7, the measured curve HK12 proceeds largely constant from the aggregate intensity value OP12* (break location) given further enlargement of the fiber spacing VZ1. The displacement path AK12* is allocated to this aggregate intensity value OP12*. Correspondingly, the measured curve HK22 likewise already merges essentially into a constant straight line beginning with the aggregate intensity value OP22* given the displacement path AK22*<AK12*. No further pixel elements of the second measurement window thus proceed into the bright illumination light of the widening gap space given further parting of the fiber ends beginning with the displacement path AK22*. The relative displacement path DZ2* between the two aggregate intensity values (break locations) OP12* and OP22* then again corresponds to the overall sum of the individual offsets of the fiber end faces TF11, TF21 in the Z-direction between the two measurement windows MF12, MF22. In particular, DZ2*=DZ2= DZ12+DZ22 thus applies.

In this modified measurement method, the condition during the course of the overall light level of the respective measurement window during the fiber parting is registered when the light level or, respectively, aggregate intensity value of this measurement window no longer exhibits any significant change. The displacement path DZ2* is thereby identified by which the two fiber ends are additionally moved apart in order, time-offset relative to a first of the at least two measurement windows, to also be able to register that condition in the second measurement window from which no significant change in brightness derives. The observation of a single brightness condition in the respective measurement window thus already suffices.

The two above measuring methods that were explained with reference to FIGS. 3–5, 7 are largely independent of whether the two measurement windows exhibit the same basic brightness or lack of brightness in the initial position of the two fiber ends of FIG. 3 (gap closure over the entire fiber cross-section). Both paths are merely aimed at comparing similarities in the course of the aggregate intensity values of the two measurement windows to one another. Particularly the displacement path by which the two fiber ends are displaced in order, with reference to a first of the two measurement windows, to also obtain the same brightness curve of the light level acquired overall in the second, other measurement window than yields the overall offset of the fiber end faces between the two measurement windows in the Z-direction. Expressed in general terms, the intensity values of the two measurement windows are registered in at least two displacement locations of the fiber parting and are compared to one another.

The fiber parting of the two fiber ends FE1, FE2 is preferably implemented with a greater topical resolution than the sampling of the fiber images in their respective measurement windows MF12, MF22. The fibers FE1, FE2 are thus moved apart in the Z-direction step-by-step only by such a respective distance that lies below the length of a pixel element in the displacement direction, which is the Z-direction. The two fiber ends are thus moved apart relative to one another with step widths that lie in the "sub-pixel range". The precision with which information can be acquired about the gap region between the two fiber ends becomes all the higher with the smaller selected step width of the fiber parting.

In practice, the two fiber ends are expediently successively moved apart by a respectively prescribable step width and then the two fiber ends are held or arrested in the new position, the aggregate intensity values, i.e., overall life levels of the measurement windows are formed in these arrested fiber positions, and these aggregate intensity values are retained for interpretation. In this way, the two measured curves HK12, HK22 can be registered for defined fiber spacings VZ1 by step-by-step displacement of the fiber ends and, thus, can be registered for discrete fiber distances.

The following advantages thus particularly occur given the inventive measurement version according to FIGS. 3–5 and 7:

Only the fiber spacing at the beginning of the gap opening is considered. How great the brightness in the respective measurement window is at this point in time plays no part. What is only important is that the point in time when the brightness in the measurement window begins to change is registered. The inventive measurement method is thus largely insensitive to spatial and temporal inhomogeneities of the brightness in the image portion being viewed.

The measuring precision given these particularly preferred versions of the inventive method continues to be only slightly dependent on the resolution quality of the evaluated image. On the contrary, the precision is defined by the resolution with which the spacing of the fibers can be varied in the Z-direction. In standard splicing devices, however, this is usually very high due to the required positioning precision for the fibers. It preferably lies at an approximately 8 nm step width. In practical tests, a measuring precision of approximately ±0.1° was achieved, and this will correspond to an error in the attenuation determination of ±0.004 dB. As a result of further influences on the measuring precision, a precision of approximately ±0.02 dB can be achieved in the attenuation determination.

Further, the various versions of the inventive measuring method are particularly distinguished in that they can be implemented in previous splicing devices without additional hardware components.

In an expansion of the method, finally, more than two measurement windows can be advantageously arranged in the respective plane of observation in the transition zone between the two fiber images thereat. The precision with which the information about the gap region can be acquired is all the higher with the greater number of observation windows. In particular, the actual course of the edge of the fiber end face can be approximately determined between two respective measurement windows. Statements about the planarity of the fiber end faces can thus be acquired with this information.

When the end faces of the fiber ends exhibit relatively great end face angle errors, it can potentially occur that the trans-axial gap between the two fiber ends cannot be completely closed at the beginning of the inventive measuring method for all measurement windows because the fiber ends already physically touch. In this case, the brightness in the respective observation zone or in the respective measurement window in which the fiber gap is opened is expediently stored and the fibers are then moved apart until the same brightness is achieved in the other observation zone or in the other measurement window. Expressed in other words, it can also be expedient to determine those displacement paths between the two fibers whereat approximately the same brightness, particularly the same aggregate intensity value respectively occurs from the curves of the aggregate intensity values HK12, HK22 of FIG. 7. An initial offset OS by which the aggregate intensity values of the measured curves HK12, HK22 of the two measurement windows MF12, MF22 differ can also be taken into consideration as warranted in that this offset OS is added up for the measured curve HK12, which is placed lower. As a result thereof, inhomogeneities in the illumination of the measurement windows can be largely compensated.

In practice, however, the end faces residing perpendicular to the fiber axis can only be manufactured with difficulty. With monomode silica glass fibers, standard fiber parting devices produce end face error angles of below 0.8° on average. This can lead to an overall error angle of up to 1.6° given an unfavorable orientation of the fiber end faces. The air gap attenuation given this overall error angle increases from 0.3 dB to 0.4 dB, as can be seen from the diagram of FIG. 19, wherein the overall angle error WIG is entered along the abscissa, and the air gap attenuation LR is allocated to the ordinate. In order to minimize the average error in the attenuation determination, a value of 0.35 dB is expediently set for the air gap attenuation LR so that the attenuation, given extremely good orientation of the fiber end faces, is indicated to be 0.05 dB smaller and, in the worst case for end face orientation, the attenuation is 0.05 dB higher. In order to be able to determine the splice attenuation LS more precisely than ±0.05 dB, the overall angle error between the end faces of the fiber ends is identified according to the inventive method. Particularly with the assistance of the diagram according to FIG. 19, the appertaining air gap attenuation can then be determined.

In order to be able to determine the overall spatial angle of the end faces of the two fiber ends FE1, FE2 of FIG. 2, the disclosed measuring methods are implemented for determining the overall sum of the end face offsets in the Z-direction between the two measurement windows in at least two observation planes. Preferably, the two planes of observation are selected differing by approximately 90° from one another. The respective measuring method or arbitrary combinations of the measuring principles described above are implemented particularly both in the X, Z plane as well as in the Y, Z plane of observation. Then deriving for the overall spatial angle is $$WIR = \arctan\sqrt{(\tan WIG)^2 + (\tan WIG*)^2},$$

WIR is the overall spatial angle between the fiber end faces, WIG is the overall error angle between the fiber end faces in the X, Z plane of observation, and
WIG* is the overall error angle between the fiber end faces in the Y, Z plane of observation.

The overall spatial error angle between two fiber end faces to be welded to one another is of significance, particularly for defining the splice attenuation of the two fiber ends welded to one another. Given a splice measuring apparatus, schematically illustrated in FIG. 16, the attenuation that is produced by the finished splice is among those things of interest. In order to identify this attenuation, light is preferably coupled into the first fiber FE1 preceding the splice SS with the assistance of a first infeed element BK1, particularly a flex coupler. This measuring light is then coupled out of the second fiber FE2 following the splice SS with an outfeed element BK2, particularly a flex coupler. The measuring light with the original power PEi is thereby supplied into the first fiber FE1 via the infeed element BK1. Attenuation losses that are taken into consideration with a coupling factor ai occur during infeed. Measuring light only having a light power Pi for which $$PEi = ai \cdot Pi.$$

applies thus propagates in the first fiber FE1. Analogous thereto, the power Po of the measuring light coupled over into the second fiber FE2 with the outfeed element BK2 is converted into the external power PEo. Losses thereby also occur in the outfeed, these again being capable of being described with a coupling factor ao, so that $$PEo = ao \cdot Po.$$

In general, both coupling factors ao, ai are unknown. A reference measurement is therefore expediently implemented before the ultimate joining of the two fiber ends FE1, FE2. The attenuation LR of the air gap LS that forms between the as yet unjoined optical fibers FE1, FE2 of FIG. 17 serves as reference value. When, for example, the two fiber ends reside at a spacing of approximately 5 μm with fiber cores aligned parallel and in alignment with one another and when their end faces are aligned exactly perpendicular to the fiber axis and are also planarly fashioned, then a reference value of approximately 0.3 dB derives for the air gap attenuation.

$$LR = 10 \log\left(\frac{ai \cdot PEi}{ao \cdot PERo}\right)$$

thereby then applies. PERo is thereby the outfed power following the air gap LS in the reference measurement. In the actual splice attenuation measurement following thereupon, the coupling factor ai and ao as well as the infed power PEi will preferably remain largely unmodified. Then deriving for the splice attenuation LS after the implementation of the splice according to FIG. 18:

$$LS = 10 \cdot \log\left(\frac{ai \cdot PEi}{ao \cdot PESo}\right)$$

In the case of the finished splice connections, PESo thus indicates the externally outfed power. The unknowns in the above equation for the splice attenuation LS can be eliminated with the assistance of LR, so that the following relationship is obtained:

$$LS = LR + 10 \cdot \log\left(\frac{PERo}{PESo}\right)$$

It can also be expedient to implement the kinematic reversal of the measuring methods according to FIGS. 2–5. The two fiber ends, as shown in FIG. 6, are first brought into an initial condition so that the fiber images VB11, VB21 in the X, Z plane of observation lies so far apart that the measurement windows MF12, MF22 lie completely in the gap space. The second fiber FE2 is then displaced toward the first fiber FE1 in the Z-direction VZ1*. While the two fiber images are being pushed toward one another, the intensity values of the measurement windows are separately registered and offered for interpretation. In particular, the aggregate intensity values of the measurement windows are respectively formed. Appertaining measured curved HK22*, HK12*, which are shown in dot-dashed lines in FIG. 7, occur for the two measurement windows MF22, MF12 that lie mirror-symmetrically relative to the measured curves HK22, HK12 of FIG. 7. Since the gap closes first in the proximity of the first measurement window MF12, a decrease in the aggregate intensity values of the first measurement window occurs first. A drop of the aggregate intensity values also occurs in the second measurement window only after a delayed displacement path of the fiber ends toward one another. By comparing the aggregate intensity values of the two measurement windows, thus, information can likewise be derived about the fiber end faces. In particular, an overall sum of the axial fiber face offsets in the Z-direction can be determined between the two measurement windows.

The respective measurement window is expediently dimensioned and placed with the two fiber ends of FIGS. 3–6 residing opposite one another so that each measurement window—during the relative motion of the two fibers away from one another or toward one another—simultaneously covers or crosses an individually allocated edge location of the end face of the one as well as of the other fiber at least once and preferably during the majority time span of the displacement motion. As a result thereof, information about the relationship of the two fiber end faces relative to one another can be advantageously acquired. Particularly their overall skewed angle, in a single measuring event.

Figure 8:
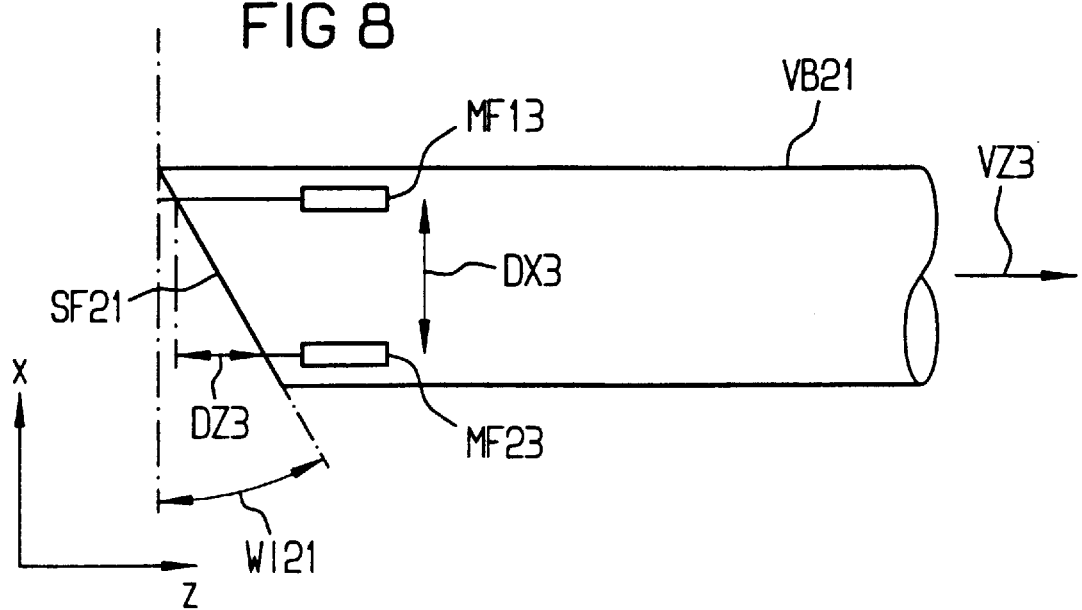
Figure 9:
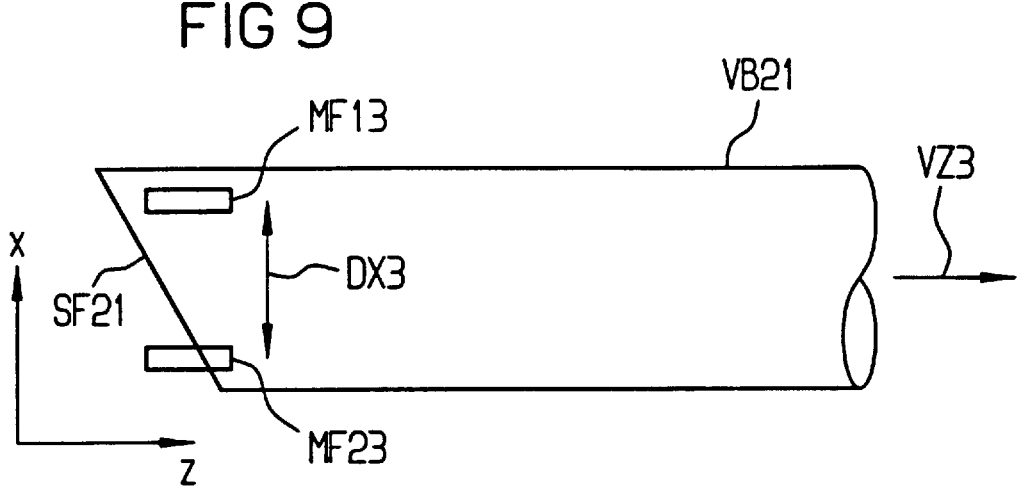

On the basis of schematic shadowgrams VB21 of the fiber FE2 in the X, Z plane of observation, FIGS. 8–10 illustrate how information can be individually acquired about an end face SF21. In FIGS. 8–10, two measurement windows MF13, MF23 are respectively allocated to the same Z-longitudinal locations. They are defined within a stripe of the X, Z plane of observation that is limited by the imaginary extensions of the long sides of the fiber image VB21. Viewed in the X-direction, they exhibit a lateral offset DX3 from one another. The fiber FE2 is first brought into an initial position so that at least two measurement windows MF13, MF23 lie completely within the fiber image VB21 of the X, Z plane of observation. Proceeding from this initial position, the fiber is shifted to such an extent over the measurement windows until every measurement window MF13, MF23 has partially or entirely crossed the edge of the imaged end face SF21 at different edge locations, for example at two different edge locations here. The measured intensity values of the observation measurement windows are thereby continuously registered and offered for interpretation. In FIG. 8, the fiber end is displaced in the Z-direction VZ3 relative to the defined measurement windows MF13, MF23. Since, as viewed in the Z-direction, the second measurement window MF23 is located closer to the fiber edge SF21, this second measurement window MF23 first crosses alone, for example first crosses the fiber end face edge SF21. FIG. 9 shows this position of the fiber image VB21.

Whereas the majority part of the second measurement window MF23 already lies outside the fiber image VB21, the first measurement window MF13 in FIG. 9 is still located within the fiber image VB12. The second measurement window MF23 thus becomes bright earlier than the first measurement window MF13. When the second fiber FE2 is moved farther away from the stationarily defined measurement windows in the Z-direction, then the fiber edge SF21 also ultimately crosses the first measurement window MF13, as shown in FIG. 10. Whereas the second measurement window MF23 already lies completely outside the fiber image VB21, only now is the first measurement window MF13 crossed by the fiber end face edge SF21.

FIG. 11 shows a schematic illustration of a brightness diagram that can be registered given the inventive version according to FIGS. 8–10. The relative displacement path VZ3 of the fiber FE2 relative to the stationary measurement windows MF13, MF23 is entered along the abscissa and the aggregate intensity values of the two measurement windows MF13, MF23 are respectively separately allocated to the ordinates of the brightness diagram. Appertaining measured curves HK13, HK23 occur during the displacement movement of the fiber end FE2 relative to the measurement windows MF13, MF23. The respective measured curve, in particular indicates the change in brightness from dark to bright in the respective measurement window. Since the end face edge SF21 crosses the second measurement window MF23 first and does not cross the first measurement window MF13 until later, i.e., after covering a further displacement path VZ3, the two measured curves HK23, HK13 are offset relative to one another by a relative displacement path DZ3. This offset DZ3 in the Z-direction corresponds to the end face offset of the end face SF21 in the Z-direction between the two measurement windows MF13, MF23. Given knowledge of the lateral transverse spacing DX3 of the two measurement windows MF13, MF23, it is thus advantageously possible to determine the error angle WI21 of the end face SF21 individually according to the following relationship:

WI21=DZ3/DX3.

FIGS. 12–15 show a compilation of alternatives for the implementation of the inventive method with which statements or, respectively, information can be respectively acquired about the end face of an individual optical fiber. Each of FIGS. 12–15 respectively represents an optical fiber end with its shadowgram in the X, Z plane of FIG. 2. The fiber shadowgram is illustrated by way of example in three different positions with reference to two measurement windows in each of the FIGS. 12–15 in order to be able to illustrate various possibilities of relative movements between the measurement windows and the fiber. The three fiber images are thereby shown respectively lying under one another. At the same time, a respective brightness diagram corresponding to FIG. 11 is shown in the right half of each of the drawings of FIGS. 12–15 in order to be able to better illustrate the curve of the aggregate intensity values in the measurement windows during the different displacement events. FIGS. 12–15 represent the first, left-hand fiber FE1 of FIG. 2 with a differently fashioned end face that is mirrored imaged along the longitudinal fiber axis compared to that of FIG. 1, i.e., the lower fiber corner now projects farther than the upper fiber corner. The fiber FE1 is thus now rotated by 180° in circumferential direction relative to the fiber FE1 of FIG. 1.

Figure 12:
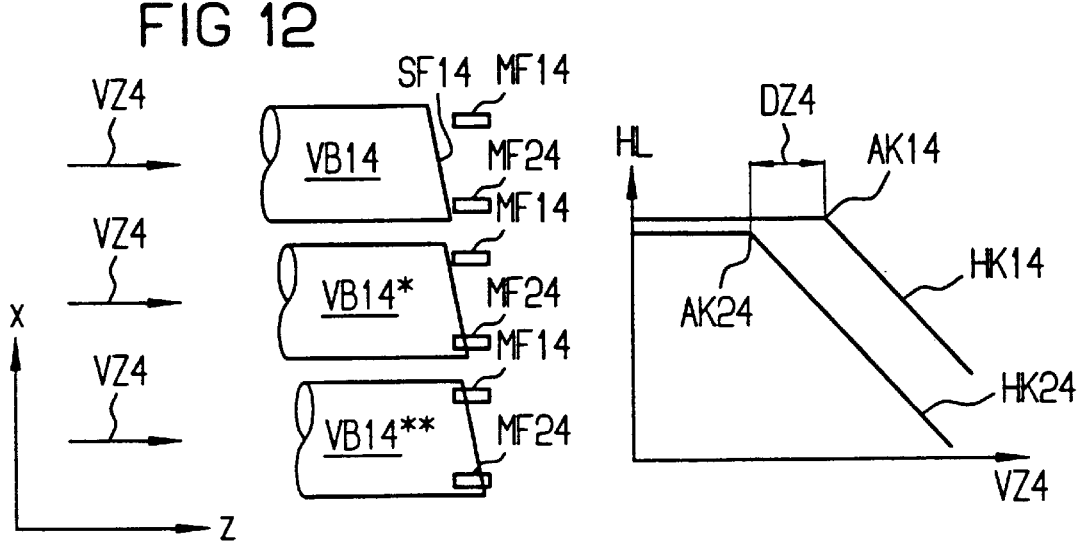

In the upper half of the drawing of FIG. 12, the fiber image in an initial position VB14 of the first fiber is at such a distance from two measurement windows MF14, MF24 that these measurement windows lie completely outside the fiber image. The two measurement windows MF14, MF24 are defined in a zone to the right of the end face SF14 of the fiber image VB14. This zone lies within a stripe of the X, Z plane of observation that is limited by the imaginary extensions of the long sides of the fiber image VB14. The two measurement windows are respectively allocated to the same Z longitudinal locations. They each respectively comprise approximately the same surface form. The two measurement windows MF14, MF24 are offset laterally relative to one another by a prescribable transverse distance with reference to the longitudinal axis of the fiber image VB14. The first measurement window MF14 is allocated to the imaginary extension of the upper long side of the fiber image VB14 and the second measurement window MF24 is allocated to the imaginary extension of the lower long side of the fiber image VB14. The entire detection surface of the respective measurement window MF14, MF24 is impinged by illumination light in this initial condition, i.e., the sum of the intensity values of the respective measurement window MF14 or, respectively, MF24 is maximum. Proceeding from this initial position of the image VB14, the fiber FE1 is now shifted across the measurement windows so that each measurement window partially or entirely individually crosses the edge of the imaged fiber end face SF14. In FIG. 12, the fiber is shifted toward the two measurement windows MF14, MF24 in the Z-direction, which is indicated by an arrow VZ4. The successive advance of the fiber image VB14 toward the stationary measurement windows MF14, MF24 is indicated by two further fiber images under the first, upper fiber image VB14 of FIG. 12. The fiber image is referenced VB14* in the middle position. There, the fiber end face intersects only the second measurement window MF24, whereas the measurement window MF14 lies completely outside the fiber image VB14*. As soon as the measurement window MF24 crosses the fiber end face edge SF14, a drop of its aggregate intensity value occurs. Expressed in other words, this means that its intensity values change from bright to dark. In the brightness diagram, the measured curve HK24 for the second measurement window MF24 therefore exhibits a break point AK24. The brightness curve HK14 proceeds constant as long as the first measurement window MF14 lies outside the fiber image VB14. The light intensity incident overall and the overall measured light level decreases thereat as soon as the fiber end face edge SF14 advances into the measurement field of the second measurement window MF24. Given further advance of the fiber image, the end face edge SF14 also ultimately ends up on the measuring surface of the first measurement window MF14, as shown by the image VB14**. As soon as the end face edge SF14 begins to also occlude the first measurement window MF14 or to darken it, the light intensity level picked up by the first measurement window MF14 decreases. The measured curve HK14 allocated to the first measurement window MF14 therefore likewise exhibits a break point AK14. The break point AK14 identifies the turning point from which the largely constant intensity level abruptly drops. The constant intensity level of high brightness HL thus occurs up to that displacement location of the fiber image wherein the first measurement window still lies entirely outside the fiber image VB14 and is not yet occluded. The light intensity level acquired by the first measurement window MF14 is all the lower the farther the fiber image is pushed into the first measurement window MF14. The offset DZ4 between the two break locations or points AK24, AK14 in the brightness diagram then indicates that offset in the Z-direction by which the end face hangs over in the Z-direction between the two measurement windows MF14, MF24.

Figure 13:
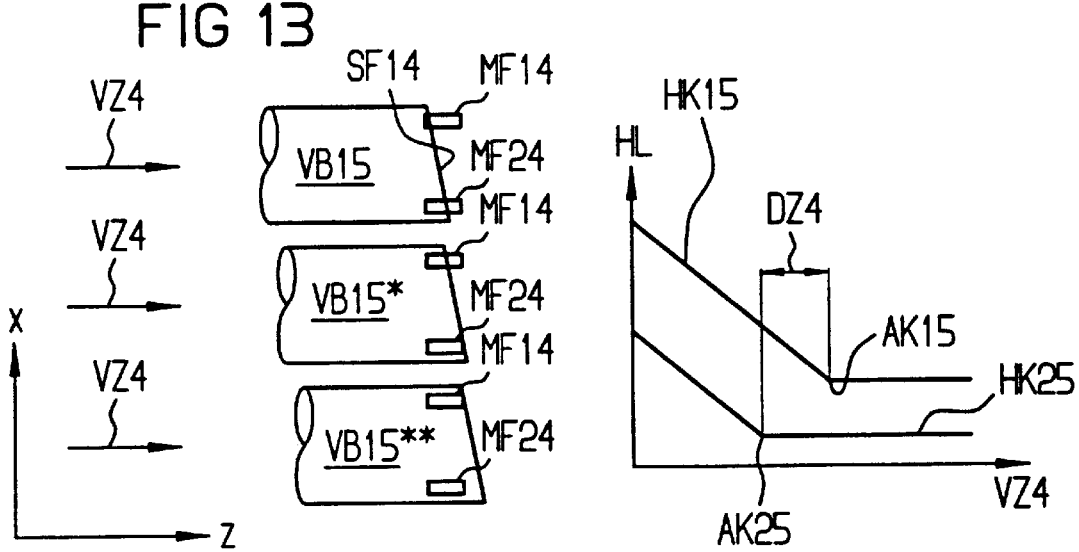

Information about an individual fiber end face can also continue to be determined in that the fiber to be investigated is positioned relative to the measurement windows MF14, MF24 so that the end face edge SF14 simultaneously intersects both measurement windows MF14, MF24. This situation is shown in the upper half of the drawing of FIG. 13 by the fiber image VB15. Proceeding from this initial position of the fiber end, the fiber is now shifted in the Z-direction toward the right and toward the measurement windows MF14, MF24. The fiber image thereby occludes the two measurement windows farther and farther. Expressed in other words, this means that the measurement windows MF14, MF24 migrate farther and farther into the inside of the fiber image VB15. Two other, different occlusion conditions of the two measurement windows MF14, MF24 are illustrated in FIG. 13 with the assistance of two additional images VB15*, VB15 of the fiber. Whereas, the first as well as the second measurement window MF14, MF24 are still partially bright given the fiber image VB15 of FIG. 13 are only partially covered by the shadowgram of the fiber, the intensity level of the measurement windows MF14, MF24 decreases given continued advancement of the fiber image until each measurement window ultimately comes to lie completely in the inside of the fiber image VB15. In the right half of the drawing of FIG. 13, a brightness diagram HL dependent on the displacement path VZ4 of the fiber is additionally entered for this movement event of the fiber relative to the measurement windows. The curve of the measured intensity level of the first measurement window is referenced HK15 and the curve of the measurement intensity level of the second measurement window MF24 is referenced HK25. Both measured curves HK15, HK25 respectively exhibit a breaking or turning location AK15, AK25 after which only a constant brightness level can be measured. This constant brightness level thereby lies lower than the remaining intensity level of the measured curves HK15, HK25. The offset DZ4 between the two break points AK15, AK25 then again corresponds to the sought offset of the fiber end face. Viewed in the fiber advance direction VZ4, the break point AK25 in the measured curve HK25 occurs earlier than the break point AK15 in the measured curve HK15 because the second measured window MF24 comes to lie completely in the inside of the fiber image VB15** earlier due to the slanting fiber end face.

In addition, it is also possible to reverse the motion event compared to the measuring method of FIG. 13. To that end, the fiber to be investigated in FIG. 14 is brought in such an initial condition that the two measurement windows MF14, MF24 are initially located completely within the fiber image VB15. The fiber is then moved toward the left away from the stationary measurement windows MF14, MF24, this being indicated by a displacement arrow VZ5 in FIG. 14. The three fiber images with the measurement windows allocated to them are thereby shown in the reverse sequence compared to FIG. 13. First, the fiber end face SF14 migrates across the first measurement window MF14 since it lies closer to the fiber end face edge SF14 in the initial position VB15. The end face edge also migrates across the second measurement window only later during the continued movement of the fiber image VB15 away from the measurement windows. This is shown in the third position of the fiber image VB15 in FIG. 14. The overall intensity levels registered with the assistance of the measurement windows MF14, MF24 during this displacement movement of the fiber are shown in the brightness diagram in the right half of the FIG. The course of the curve of the light level in the first measurement window MF14 dependent on the fiber advance VZ5 is referenced HK15*, the intensity level curve in the second measurement window is reference HK25*. The two measured curves HK15*, HK25* lie axially symmetrical relative to the brightness curves HK25, HK15 of FIG. 13 with respect to the abscissa HL.

FIG. 15, finally, shows the kinematic reverse motion relative to the fiber displacement of FIG. 12. In FIG. 15, the three fiber images VB14, VB14*, VB14** of FIG. 12 are shown in the reverse sequence. The fiber is thus first brought in such an initial position that both measurement windows MF14, MF24 cross the end face edge SF14. The fiber is then shifted toward the left away from the two stationary measurement windows opposite the direction VZ4 and moved away, this being indicated by the displacement arrow VZ5. The first measurement window MF14 comes completely outside the fiber image VB14* first. The second measurement window MF24 also comes to lie completely outside the fiber image VB14 time-delayed relative to the first measurement window MF14 only after an additional fiber displacement in the Z-direction. The brightness diagram for the two measurement windows shown in the right half of the FIG. shows measured curves HK14*, HK24* that, with respect to a parallel line to the abscissa HL of FIG. 14, lies axially symmetrically relative to the measurement intensity curves HK24, HK14 therein. The two measured intensity curves HK14*, HK24* first increase with increasing distance of the fiber image from the measurement windows, increasing steadily up to a breaking or turning point AK14*, AK24* from which they continue to proceed constantly. The breaking points AK14*, AK24* thus mark those fiber positions from which the respective measurement window MF14 or, respectively, MF24 lies completely outside the fiber image and is no longer occluded by it. The fiber end face offset DZ4 in the Z-direction can then be likewise determined from the path difference between the two breaking points AK14*, AK24*.

Viewed overall, the respective fiber end is brought into position with respect to at least two measurement windows so that, in the respective plane of observation, the edge of the imaged end face is covered or crossed at least once during the fiber motion by each measured window at different edge locations. The intensity values of the measurement windows are thereby continuously registered and offered for interpretation during the displacement movement of the fiber. Information about fiber end face can be derived by comparing the intensity values of the measurement windows.

Preferably, the fiber is displaced relative to the stationarily defined measurement windows. The reason for this is that, in particular, the fiber can be moved forward step-by-step in practice with a substantially higher resolution than the plane of observation can be scanned with the respective measurement window.

As warranted, the fiber can also be continuously moved forward and the intensity values of the measurement windows can be read out at prescribable time intervals and offered for interpretation. The time intervals are thereby expediently selected so that corresponding displacement paths derive for the fiber movement that are respectively smaller than the spacing of two pixel elements in fiber direction.

In that, with the assistance of at least two measurement windows, the fiber end face edge is covered or crossed at least once at different edge locations transversely relative to the longitudinal fiber direction, the error angle of the end face of an individual fiber can, in particular, be determined. When two fiber ends reside opposite one another, then the overall error angle between the two fiber end faces can be determined, for example, according to the measuring principles of FIGS. 3–6, whereas the end face angle of, for example, the right-hand second fiber can be determined according to one of the motion sequences of FIGS. 12–15. By subtracting the end face error angle of the first fiber from the overall error angle, the individual end face error angle of the second fiber can then also be identified.

As warranted, it can also be expedient to correspondingly displace the measurement windows relative to the respective stationary fiber image while the fiber to be respectively measured remains stationary.

When the displacement of the measurement windows is merely implemented by corresponding drive of the pixel elements of the respective pickup means such as, for example, VKY of FIG. 2 with the assistance of the calculating means CPU, then this occurs at the expense of the measuring position in practice. The measurement windows can then only be shifted by pixels, i.e., with the predetermined spacing between two neighboring pixel elements. The movement of the measurement windows relative to the fiber images, however, can be realized in an especially simple way since this can be implemented without mechanism in the calculating means CPU itself. Positioning devices for fiber movement can then be potentially eliminated.

It can also be potentially expedient to move both the respective fiber a well as the measurement windows relative to one another.

Moreover, arbitrary relative movements of the respective fiber relative to the measurement windows in arbitrary spatial directions are possible as long as the respective fiber end face edge is covered by at least two measurement windows at different edge locations and the measured intensity values of the measurement windows are thereby respectively registered and offered for interpretation.

In addition to or independently of its lateral offset, the at least two measurement windows such as, for example, MF12, MF22 of FIG. 3 can also be potentially defined offset relative to one another as viewed in longitudinal fiber direction. This offset, which is a permanently prescribed longitudinal offset of the measurement windows in longitudinal fiber direction, is then expediently co-calculated into the displacement path that the respective fiber and the measurement windows execute relative to one another in the longitudinal fiber direction according to the measuring methods of FIGS. 2–15.

Although various minor modifications may be suggested by those versed in the art, it should be understood that I wish to embody within the scope of the patent granted hereon all such modifications as reasonably and properly come within the scope of my contribution to the art.

I claim:

1. A method for acquiring information about an end face of at least one optical fiber end, said method comprising generating a fiber image for a fiber end in at least one plane of observation, providing at least two measurement windows offset from one another in the plane of observation in a direction transverse to the longitudinal direction of the fiber image, moving the fiber and measurement windows relative to each other so that a different location of an edge of the fiber image formed by the end face crosses each of the measurement windows, registering an intensity value of each measurement window as the fiber and measurement windows are moved relative to each other, the intensity value of each measurement window being summed up as a sum intensity value at different displacement locations during the motion of the fiber relative to the measurement windows, and deriving the information about the end of the fiber based on comparing the sum intensity values of the at least two measurement windows and by determining the changes in the sum intensity of each measuring window.

2. A method according to claim 1, wherein the at least two measurement windows are defined within a stripe of a respective plane of observation that is limited by an imaginary extension of the long sides of the fiber image.

3. A method according to claim 1, wherein the extent of the respective measurement window in the longitudinal fiber direction is selected to be greater than a transverse extent relative to the longitudinal axis of the fiber.

4. A method according to claim 1, wherein the two measurement windows are defined laterally offset relative to one another by a prescribable transverse distance with reference to the longitudinal axis of the fiber.

5. A method according to claim 1, wherein at least one of the measurement windows is defined with two edge zones of the fiber image proceeding in a longitudinal fiber direction.

6. A method according to claim 1, wherein approximately the same surface shape is selected for each of the measurement windows.

7. A method according to claim 1, wherein at least two measurement windows are allocated to approximately the same longitudinal location along the fiber extent.

8. A method according to claim 1, wherein the measurement windows are defined essentially axially symmetrically relative to one another with respect to the longitudinal fiber axis.

9. A method according to claim 1, wherein the at least two measurement windows are defined offset relative to one another viewed in the longitudinal fiber direction.

10. A method according to claim 1, wherein the measurement windows are defined essentially parallel to one another.

11. A method according to claim 1, wherein the at least one of the measurement windows comprises a measuring line of light-sensitive elements.

12. A method according to claim 1, wherein the fiber, as well as the two measurement windows, are positioned relative to one another so that the edge of the end face of the fiber image is simultaneously covered by at least the two measurement windows.

13. A method according to claim 12, which includes registering the topical intensity distribution of the image portion of the plane of observation covered by the measurement windows.

14. A method according to claim 13, wherein a potential axial longitudinal offset of the edge of the end face between the intersection with the two measurement windows is determined from the topical intensity distribution.

15. A method according to claim 14, wherein a potential error angle of the fiber end face is determined according to the relationship WI2=arctan (DZ21/DX), wherein WI2 is the error angle of the fiber end face, DZ21 is the axial longitudinal offset of the edge of the end face between the intersections with the two measurement windows and DX is the lateral transverse spacing of the measurement windows.

16. A method according to claim 1, wherein the fiber as well as the measurement windows are shifted relative to one another until each measurement window has at least partially crossed the end face of the fiber image.

17. A method according to claim 16, wherein the fiber is shifted in the longitudinal fiber direction relative to stationarily defined measuring windows.

18. A method according to claim 16, wherein displacement movement of the fiber is implemented with a greater topical resolution than the scanning of the fiber image in the respective measuring windows.

19. A method according to claim 16, wherein the displacement path of the fiber in which approximately the same brightness respectively occurs is determined from the curves of the aggregate intensity values of the measurement windows.

20. A method according to claim 1, wherein the fiber is first brought into an initial position with the measurement windows lying completely within the fiber image and the step of moving shifts the fiber from this initial position to a position wherein each measurement window at least partially crosses the edge of the end face of the fiber image.

21. A method according to claim 20, wherein the displacement path of the fiber at which a brightness rise respectively begins is determined from curves of the aggregate intensity value of the measurement windows.

22. A method according to claim 1, wherein the fiber is first brought into an initial position with the measurement windows lying completely outside of the fiber image, said step of relative movement moves the fiber from this initial position and shifts the fiber until each measurement window has at least partially crossed the edge of the end face of the fiber image.

23. A method according to claim 1, wherein the displacement path of the fiber at which a drop in brightness begins is determined from the curve of the aggregate intensity value of the respective measurement window.

24. A method for acquiring information about a gap region between two optical fiber ends residing opposite one another, said method including generating a fiber image with edges formed by end faces of the two fiber ends in at least one plane of observation, bringing the fibers into position relative to one another with respect to at least two measurement windows so that the edges of the fiber images formed by the end faces are crossed at least once in the respective plane of observation by the at least two measurement windows at different edge locations, registering the intensity value of the measurement windows for interpretation, and deriving information about both fiber ends and the gap region by comparing the intensity values of the measurement windows.

25. A method according to claim 24, wherein at least two measurement windows are defined within a stripe of the respective plane of observation that is limited by the imaginary extension of the long sides of the fiber images, said at least two measurement windows respectively extending in the longitudinal fiber direction and being laterally offset relative to one another by a prescribable transverse distance with reference to the longitudinal axis of the fibers.

26. A method according to claim 25, wherein the fibers as well as the two measurement windows are brought into position relative to one another so that a gap region between the two fiber images is crossed in the longitudinal fiber direction at least once by each measurement window and in that the intensity values of the measurement windows in this position are registered and offered for interpretation.

27. An apparatus for acquiring information about an end face of at least one optical fiber end, said apparatus including optical imaging means for generating a fiber image for the fiber end in at least one plane, means for forming at least two defined measurement windows being spaced apart in a direction transverse to a longitudinal axis of the at least one optical fiber for measuring intensity values, positioning means being provided for moving the at least one fiber relative to the measurement windows so that the fiber has an edge of the fiber image formed by the end face being crossed at least once in a respective plane of observation by the at least two defined measurement windows at different locations, calculating and evaluation means being provided for registration as well as interpretation of the intensity value of each of the measurement windows, said calculating and evaluation means creating information about the fiber end face by comparing the intensity value from the two defined measurement windows.

* * * * *